US009969351B2

(12) United States Patent
Ohno et al.

(10) Patent No.: US 9,969,351 B2
(45) Date of Patent: *May 15, 2018

(54) SIDE AIRBAG DEVICE-INSTALLED VEHICLE SEAT

(71) Applicant: TOYOTA JIDOSHA KABUSHIKI KAISHA, Toyota-shi, Aichi-ken (JP)

(72) Inventors: Mitsuyoshi Ohno, Miyoshi (JP); Hiroyuki Nagura, Chiryu (JP); Masato Kunisada, Susono (JP); Yusuke Fujiwara, Toyota (JP); Atsushi Nakashima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/350,735

(22) Filed: Nov. 14, 2016

(65) Prior Publication Data

US 2017/0174174 A1      Jun. 22, 2017

(30) Foreign Application Priority Data

Dec. 16, 2015 (JP) ................... 2015-245689

(51) Int. Cl.
*B60R 21/16* (2006.01)
*B60R 21/239* (2006.01)
(Continued)

(52) U.S. Cl.
CPC .......... *B60R 21/239* (2013.01); *B60R 21/207* (2013.01); *B60R 21/233* (2013.01);
(Continued)

(58) Field of Classification Search
CPC ............... B60R 21/207; B60R 21/231; B60R 21/23138; B60R 2021/23107; B60R 2021/23386
(Continued)

(56) References Cited

U.S. PATENT DOCUMENTS 5,899,490 A * 5/1999 Wipasuramonton .. B60R 21/237
280/730.2
6,270,113 B1 * 8/2001 Wipasuramonton
................... B60R 21/23138
280/728.1
(Continued)

FOREIGN PATENT DOCUMENTS

JP      2009-023494 A      2/2009
JP      2010-208434 A      9/2010
(Continued)

OTHER PUBLICATIONS

Oct. 13, 2017 Notice of Allowance issued in U.S. Appl. No. 15/365,130.
(Continued)

*Primary Examiner* — Toan To
(74) *Attorney, Agent, or Firm* — Oliff PLC

(57) ABSTRACT

A side airbag device-installed vehicle seat including: a side frame; a side airbag main body that is partitioned into a front bag section and a rear bag section, and in which a front portion of the rear bag section is positioned further toward the seat front side than the front flange portion at least in an inflated and deployed state; and an inner bag section that extends out from the front portion of the rear bag section, past a seat front of the front flange portion, and to a seat width direction inner side of the side frame, and in which an internal portion of the inner bag section in communication with the inside of the front portion of the rear bag section is supplied with gas from the inflator and inflates within the side section.

9 Claims, 17 Drawing Sheets

(51) Int. Cl.
*B60R 21/207* (2006.01)
*B60R 21/233* (2006.01)
*B60R 21/231* (2011.01)
*B60R 21/235* (2006.01)

(52) U.S. Cl.
CPC ...... *B60R 21/235* (2013.01); *B60R 21/23138* (2013.01); *B60R 2021/23107* (2013.01); *B60R 2021/23146* (2013.01); *B60R 2021/23509* (2013.01); *B60R 2021/23538* (2013.01)

(58) Field of Classification Search
USPC .......................................... 280/728.2, 730.2
See application file for complete search history.

(56) References Cited

U.S. PATENT DOCUMENTS

| | | | | |
|---|---|---|---|---|
| 6,364,348 | B1 * | 4/2002 | Jang | B60R 21/201 280/730.2 |
| 8,528,934 | B2 * | 9/2013 | Kobayshi | B60R 21/207 280/729 |
| 8,602,449 | B2 * | 12/2013 | Kojima | B60N 2/449 280/728.2 |
| 8,702,123 | B2 * | 4/2014 | Mazanek | B60R 21/207 280/729 |
| 9,056,591 | B2 * | 6/2015 | Fujiwara | B60R 21/2346 |
| 9,290,151 | B2 * | 3/2016 | Fujiwara | B60R 21/231 |
| 9,616,791 | B2 * | 4/2017 | Awata | B60N 2/5825 |
| 2009/0020988 | A1 | 1/2009 | Sato et al. | |
| 2013/0147167 | A1 | 6/2013 | Kwon et al. | |
| 2014/0035264 | A1 | 2/2014 | Fukushima et al. | |
| 2015/0151711 | A1 * | 6/2015 | Fujiwara | B60R 21/207 280/728.2 |
| 2015/0158453 | A1 * | 6/2015 | Fujiwara | B60R 21/207 280/730.2 |
| 2015/0166003 | A1 | 6/2015 | Fujiwara | |
| 2015/0197212 | A1 | 7/2015 | Fujiwara | |
| 2015/0367804 | A1 * | 12/2015 | Fujiwara | B60R 21/207 280/730.2 |
| 2017/0225640 | A1 * | 8/2017 | Ohno | B60R 21/207 |

FOREIGN PATENT DOCUMENTS

| | | |
|---|---|---|
| JP | 2014-019393 A | 2/2014 |
| JP | 2014-031096 A | 2/2014 |
| JP | 2014-080169 A | 5/2014 |
| WO | 2014/013822 A1 | 1/2014 |

OTHER PUBLICATIONS

Nov. 24, 2017 Supplemental Notice of Allowability issued in U.S. Appl. No. 15/365,130.

* cited by examiner

SIDE AIRBAG DEVICE-INSTALLED VEHICLE SEAT

CROSS-REFERENCE TO RELATED APPLICATION

This application is based on and claims priority under 35 USC 119 from Japanese Patent Application No. 2015-245689 filed on Dec. 16, 2015, the disclosure of which is incorporated by reference herein.

BACKGROUND

Technical Field

The present disclosure relates to a side airbag device-installed vehicle seat.

Related Art

Japanese Patent Application Laid-Open (JP-A) No. 2014-080169 describes a side airbag device-installed vehicle seat. In this vehicle seat, an outer side frame provided inside a side section at the vehicle width direction outer side of a seatback includes a side wall portion and a rear wall portion, and an airbag module is installed at the seat width direction inner side of the side wall portion.

A folded side airbag and an inflator are modularized to configure the airbag module. The side airbag includes a forward-deploying airbag that inflates and deploys between an occupant and a vehicle body side section, and an inward-inflating airbag that inflates within the seatback. The inward-inflating airbag is integrally joined to a rear end portion of the forward-deploying airbag, and an internal portion thereof is in communication with the inside of the forward-deploying airbag. Gas from the inflator, housed inside the forward-deploying airbag close to a portion joined to the inward-inflating airbag, is distributed to the forward-deploying airbag and the inward-inflating airbag.

In this side airbag device, the inward-inflating airbag that inflates at an early stage inside the seatback is supported from the seat width direction outer side by the side wall portion of the outer side frame, and is also supported from the seat rear side by the rear wall portion of the outer side frame. Thus, the spine of the occupant, which has a high resistance value, is effectively restrained at an early stage by the inward-inflating airbag.

JP-A No. 2009-023494 describes a side airbag device including an inflator, a main airbag, and an auxiliary airbag.

In this side airbag device, the inflator that is disposed at the seat width direction outer side of an outer side frame of a seatback is housed inside a base end portion of the auxiliary airbag. The base end portion of the auxiliary airbag is joined to a base end portion of the main airbag, and the inside of the auxiliary airbag and the inside of the main airbag are placed in communication with each other through a communicating hole portion formed at the joint portion. A location of the main airbag further toward a leading end side than the base end portion is folded into a concertina shape at the seat front side and seat width direction outer side of the outer side frame. A location of the auxiliary airbag further toward a leading end side than the base end portion is bent from the front side of the outer side frame toward the seat width direction inner side of the outer side frame and folded into a concertina shape.

In the side airbag device with the above-described configuration, the auxiliary airbag inflates and deploys within a side section of the seatback prior to the main airbag, and moves the occupant toward the seat width direction inner side (vehicle width direction inner side), thereby widening a space between the occupant and a body side section in the vehicle width direction. This facilitates inflation and deployment of the main airbag between the occupant and the body side section.

In the side airbag device described in JP-A No. 2014-080169, the airbag module is provided at the seat width direction inner side (namely, the occupant side) of the outer side frame, such that there is a possibility that the forward-deploying airbag is more liable to impinge on the occupant during deployment. Thus, there is room for improvement from the perspective of improving deployment performance of the forward-deploying airbag (side airbag main body).

In the side airbag device described in JP-A No. 2009-023494, the main airbag is stowed at the seat front side and seat width direction outer side of the outer side frame, and the auxiliary airbag that inflates and deploys prior to the main airbag moves the occupant toward the seat width direction inner side. Thus, the main airbag is less liable to impinge on the occupant during deployment. However, configuration is such that the inflator is housed inside the auxiliary airbag, such that gas is supplied into the main airbag later than configurations in which the inflator is housed inside the main airbag, and the deployment performance of the main airbag (side airbag main body) is reduced.

In the side airbag device described in JP-A No. 2009-023494, the base end portion of the auxiliary airbag in which the inflator is housed is disposed at the seat width direction outer side of the outer side frame. A location of the auxiliary airbag further toward the leading end side than the base end portion is bent from the front side of the outer side frame toward the seat width direction inner side of the outer side frame and folded into a concertina shape. Thus, a gas supply route from the base end portion of the auxiliary airbag to the leading end side location bends sharply (in a U-shape in plan cross-section view) at the seat front of the outer side frame. Thus, there is a possibility that gas from the inflator is not smoothly supplied to the leading end side location of the auxiliary airbag, and that inflation and deployment of the auxiliary airbag is delayed. Thus, there is also room for improvement from the perspective of restraining the occupant using the auxiliary airbag (inner bag section) at an earlier stage.

SUMMARY

The present disclosure provides a side airbag device-installed vehicle seat capable of achieving both deployment performance of a side airbag main body and early restraint performance of an occupant by an inner bag section, in configurations including the side airbag main body that inflates and deploys toward the seat front side of a side section of a seatback, and the inner bag section that inflates within the side section.

A side airbag device-installed vehicle seat according to a first aspect of the present disclosure includes: a side frame that is provided inside a side section of a seatback, and that, as viewed along a height direction of the seatback, includes a side wall portion extending along a front-rear direction of the seatback and a front flange portion extending from a front end of the side wall portion toward a seat width direction inner side; a side airbag main body that is partitioned into a front bag section and a rear bag section, internal portions of the front bag section and the rear bag section being in communication with each other through an inner vent hole, that is stowed in a folded state inside the side section at a seat width direction outer side of the side frame, that receives a supply of gas from an inflator housed inside the rear bag section and inflates and deploys toward a seat front side of the side section, and in which a front portion of the rear bag section is positioned further toward the seat front side than the front flange portion at least in an inflated and deployed state; and an inner bag section that extends out from the front portion of the rear bag section, past a seat front of the front flange portion, and to a seat width direction inner side of the side frame, and in which an internal portion of the inner bag section in communication with the inside of the front portion of the rear bag section is supplied with gas from the inflator and inflates within the side section.

In the first aspect of the present disclosure, when the vehicle is in a side-on collision, for example, the inflator housed inside the rear bag section of the side airbag main body is actuated, and gas from the inflator is supplied into the rear bag section. Thus, the rear bag section inflates and deploys, and the internal portion of the inner bag section that is in communication with the inside of the front portion of the rear bag section receives gas supplied from inside the rear bag section and inflates within the side section of the seatback. Gas that has been supplied into the rear bag section is also supplied into the front bag section through the inner vent hole, and the front bag section inflates and deploys.

Note that in the present disclosure, the inflator is housed inside the rear bag section of the side airbag main body, thereby enabling gas to be supplied to the side airbag main body earlier than in configurations in which the inflator is housed inside the inner bag section. Moreover, since configuration is such that the side airbag main body is stowed on the seat width direction outer side of the side frame, the side airbag main body is less liable to impinge on the occupant during deployment than in configurations in which the side airbag main body is stowed on the seat width direction inner side of the side frame. This thereby enables deployment performance of the side airbag main body to be improved.

In the rear bag section of the side airbag main body, the front portion is positioned further to the seat front side than the front flange portion of the side frame, at least in the inflated and deployed state of the side airbag main body. The inner bag section extends out from the front portion of the rear bag section, past the seat front of the front flange portion of the side frame, to the seat width direction inner side of the side frame. The internal portion of the inner bag section is in communication with the inside of the front portion of the rear bag section. Accordingly, a gas supply route from inside the front portion of the rear bag section into the inner bag section can be configured without a sharp bend at the seat front of the side frame, thereby enabling a smooth supply of gas from inside the front portion of the rear bag section into the inner bag section. This thereby enables early inflation of the inner bag section. The inflated inner bag section receives a reaction force from the front flange portion and is inflated toward the seat width direction inner side (namely, the side of the occupant leaning against the seatback). This enables early restraint of the occupant by the inner bag section.

Accordingly, the present disclosure enables both deployment performance of the side airbag main body and early restraint performance of the occupant to be achieved.

A side airbag device-installed vehicle seat according to a second aspect of the present disclosure is the first aspect, wherein the side airbag main body is formed with a communication port at a location configuring the front portion of the rear bag section and facing the seat width direction inner side in the inflated and deployed state, the inner bag section is formed by a base cloth that is separate from a base cloth of the side airbag main body, and a peripheral edge portion of an opening formed in a base end portion of the inner bag section is joined to a peripheral edge portion of the communication port.

In the second aspect of the present disclosure as described above, the inner bag section, formed by the base cloth that is separate from the base cloth of the side airbag main body, is joined to the side airbag main body. Accordingly, for example, the side airbag main body may employ an existing side airbag that is partitioned into a front bag section and a rear bag section (what is referred to as a front-rear dual chamber side airbag) with only slight modifications (such as forming the communication port).

A side airbag device-installed vehicle seat according to a third aspect of the present disclosure is the first aspect, wherein: the inner bag section is integrally formed to the rear bag section by an extension portion where a base cloth of the rear bag section is extended from the front portion, and extends toward a side on the seat width direction inner side of the rear bag section in the inflated and deployed state; and the front bag section is formed by a base cloth that is separate from the base cloth of the rear bag section and is joined to the front portion of the rear bag section.

In the third aspect of the present disclosure, the inner bag section is integrally formed to the rear bag section by the extension portion where the base cloth of the rear bag section is extended. Namely, the rear bag section and the inner bag section are configured as a single bag body. This enables gas inside the rear bag section to be supplied into the inner bag section more smoothly than in configurations in which the inside of the rear bag section and the inside of the inner bag section are in communication with each other through the communication port formed in the base cloth of the side airbag main body, as in the disclosure according to the second aspect. This thereby enables the inner bag section to be inflated earlier than in the second aspect.

A side airbag device-installed vehicle seat according to a fourth aspect of the present disclosure is any one of the first to the third aspects, wherein the side frame includes a reaction force plate portion that extends out obliquely from a seat width direction inner end portion of the front flange portion toward a seat rear side and the seat width direction inner side, and that faces the inner bag section from the seat width direction outer side.

In the disclosure of the fourth aspect of the present disclosure, the inner bag section that inflates within the side section of the seatback receives reaction force toward the seat width direction inner side (the occupant side) from the reaction force plate portion, in addition to from the front flange portion of the side frame. This enables restraining force on the occupant by the inner bag section to be improved.

A side airbag device-installed vehicle seat according to a fifth aspect of the present disclosure is any one of the first to the fourth aspects, wherein the seatback includes a frame section configured including the side frame, and a seatback pad covering the frame section. The folded side airbag main body and the inflator are attached to the side wall portion of the side frame, and a leading end portion of the inner bag section is coupled to the frame section.

In the fifth aspect of the present disclosure, the side airbag main body and the inflator are attached to the side wall portion of the side frame, and the leading end portion of the inner bag section, which extends out from the front portion of the rear bag section of the side airbag main body, is coupled to the frame section including the side frame. This enables the inner bag section to not be offset from a specific position when covering the frame section with the seatback pad. Moreover, reaction force from the frame section can be imparted to the leading end portion of the inner bag section during inflation of the inner bag section, thereby enabling restraining force on the occupant by the inner bag section to be improved.

A side airbag device-installed vehicle seat according to a sixth aspect of the present disclosure is any one of the first to the fifth aspects, wherein the rear bag section is partitioned into an upper chamber, a vertical direction intermediate chamber, and a lower chamber that are in communication with each other at the front portion side. The inflator is housed in the vertical direction intermediate chamber, and the inside of the vertical direction intermediate chamber and the inside of the inner bag section are in communication with each other directly, and not through the inside of the upper chamber and the inside of the lower chamber.

In the sixth aspect of the present disclosure, gas generated by the inflator inside the vertical direction intermediate chamber of the rear bag section is supplied into the inner bag section without passing through the inside of the upper chamber and the inside of the lower chamber of the rear bag section. This thereby enables gas to be supplied into the inner bag section earlier than in cases in which the rear bag section is not partitioned as described above, enabling even earlier inflation of the inner bag section.

A side airbag device-installed vehicle seat according to a seventh aspect of the present disclosure is the sixth aspect, wherein the inner vent hole is configured by an upper side inner vent hole that places the inside of the upper chamber and the inside of the front bag section in communication with each other, and a lower side inner vent hole that places the inside of the lower chamber and the inside of the front bag section in communication with each other.

In the seventh aspect of the present disclosure, gas generated by the inflator inside the vertical direction intermediate chamber of the rear bag section is distributed into the inner bag section, and into the upper chamber and into the lower chamber of the rear bag section. Some of the gas distributed into the upper chamber and into the lower chamber is supplied into the front bag section through the upper side inner vent hole and the lower side inner vent hole. The gas supply route to the inside of the front bag section is accordingly lengthened, thereby enabling the supply of gas into the front bag section to be slowed. This enables commensurate priority to be given to supplying gas into the inner bag section. This thereby enables even earlier inflation of the inner bag section.

A side airbag device-installed vehicle seat according to an eighth aspect of the present disclosure is the second aspect, further including a check valve that is provided so as to be capable of opening and closing the communication port, that permits a flow of gas from inside the rear bag section to inside the inner bag section by opening the communication port, and restricts a flow of gas from inside the inner bag section to inside the rear bag section by closing off the communication port.

In the eighth aspect of the present disclosure, even in cases in which the inflator is actuated based on a signal from a collision prediction sensor that, for example, predicts a side-on collision of the vehicle, and the side airbag main body and the inner bag section are inflated at an early stage, the internal pressure of the inner bag section can be maintained by the check valve until the occupant is restrained. This enables a sufficient occupant restraining force to be obtained by the inner bag section, even in cases in which there is coordination with a collision prediction sensor as described above.

A side airbag device-installed vehicle seat according to a ninth aspect of the present disclosure is any one of the first to the eighth aspects, wherein the inner bag section is stowed inside the side section in a state spread out in a flat shape, or in a state in which a leading end side of the inner bag section is folded in two.

In the ninth aspect of the present disclosure, the inner bag section is stowed in the manner described above, thereby enabling the inner bag section to be inflated earlier than in cases in which the inner bag section is folded and stowed in a concertina shape, for example.

As explained above, the side airbag device-installed vehicle seat according to the present disclosure is capable of achieving both deployment performance of the side airbag main body and early restraint performance of an occupant by the inner bag section, in configurations including the side airbag main body that inflates and deploys toward the seat front side of the side section of the seatback, and the inner bag section that inflates within the side section.

BRIEF DESCRIPTION OF THE DRAWINGS

Exemplary embodiments of the present disclosure will be described in detail based on the following figures, wherein.

DETAILED DESCRIPTION

First Exemplary Embodiment

Explanation follows regarding a side airbag device-installed vehicle seat 10 (abbreviated to vehicle seat 10 below) according to an exemplary embodiment of the present disclosure, based on FIG. 1 to FIG. 10. In each of the drawings, the arrow FR, the arrow UP, and the arrow OUT respectively indicate a front direction (direction of travel) of the vehicle, an upward direction of the vehicle, and a vehicle width direction outer side, as appropriate. In the following explanation, unless specifically stated otherwise, explanation referring simply to the front and rear, left and right, and up and down directions refers to the front and rear in a vehicle front-rear direction, the left and right in a vehicle left-right direction (vehicle width direction), and up and down in a vehicle vertical direction.

Configuration

Figure 1:
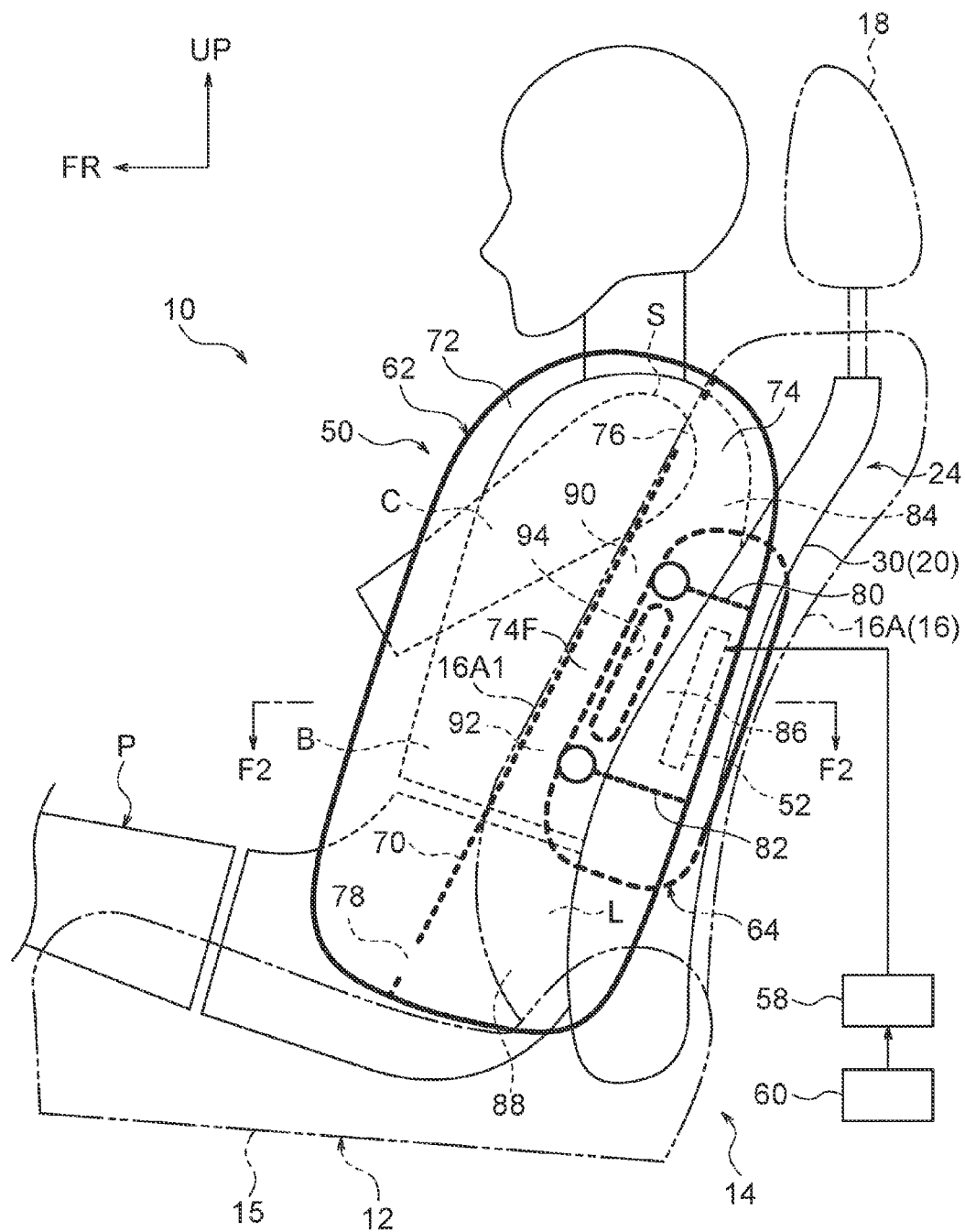
FIG. 1 is a side view of a side airbag device-installed vehicle seat according to a first exemplary embodiment of the present disclosure, illustrating a state in which a side airbag main body has inflated and deployed and an inner bag section has inflated.

As illustrated in FIG. 1, the vehicle seat 10 of the present exemplary embodiment is configured by a seat body 12 and a side airbag device 14. Detailed explanation follows regarding respective configuration elements thereof.

Seat Body 12 Configuration

The seat body 12 includes a seat cushion 15 on which an occupant P sits, a seatback 16 that is coupled to a rear end portion of the seat cushion 15 and that supports the back of the occupant P, and a headrest 18 that is coupled to an upper end portion of the seatback 16 and that supports the head of the occupant P.

Note that in the present exemplary embodiment, the front-rear direction, the left-right direction (width direction) and the vertical direction of the seat body 12 and the seatback 16 correspond to the front-rear direction, the left-right direction (width direction), and the vertical direction of the vehicle. In FIG. 1 to FIG. 3 and FIG. 5A to FIG. 9, a crash test dummy P is seated in the seat body 12 in the place of an actual occupant. The dummy P is, for example, a World Side Impact Dummy (WorldSID) of a $50^{th}$ percentile American adult male (AM50). In order to facilitate understanding, the following explanation refers to the dummy P as the "occupant P".

Figure 2:
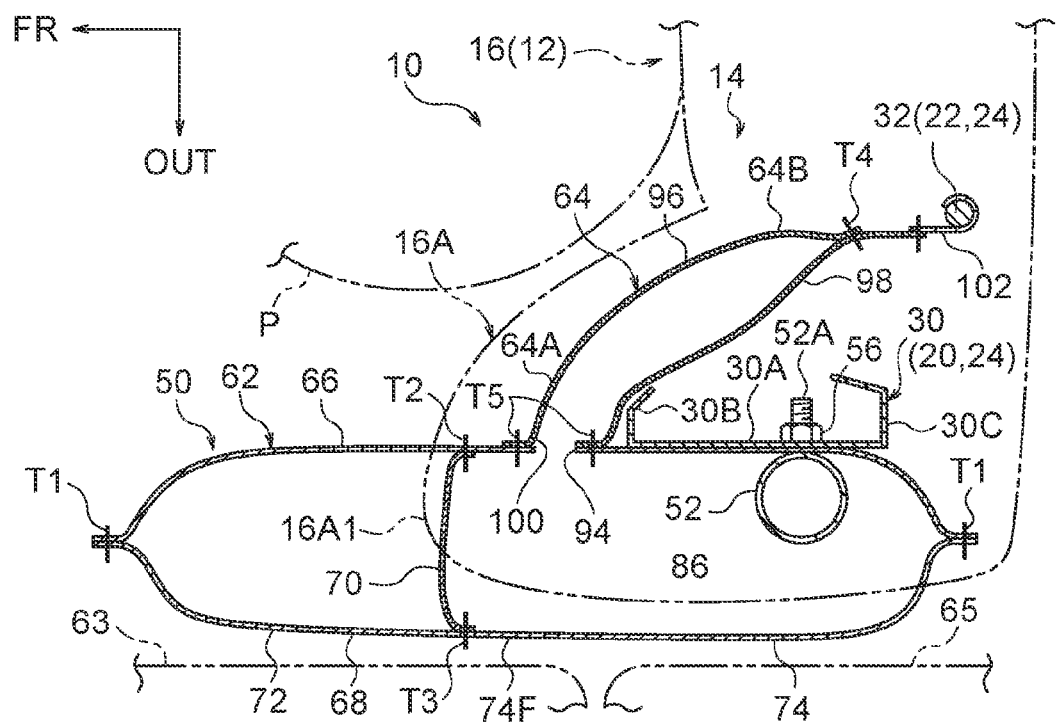
FIG. 2 is a cross-section illustrating relevant portions in close-up in a cross-section taken along line F2-F2 in FIG. 1.
Figure 3:
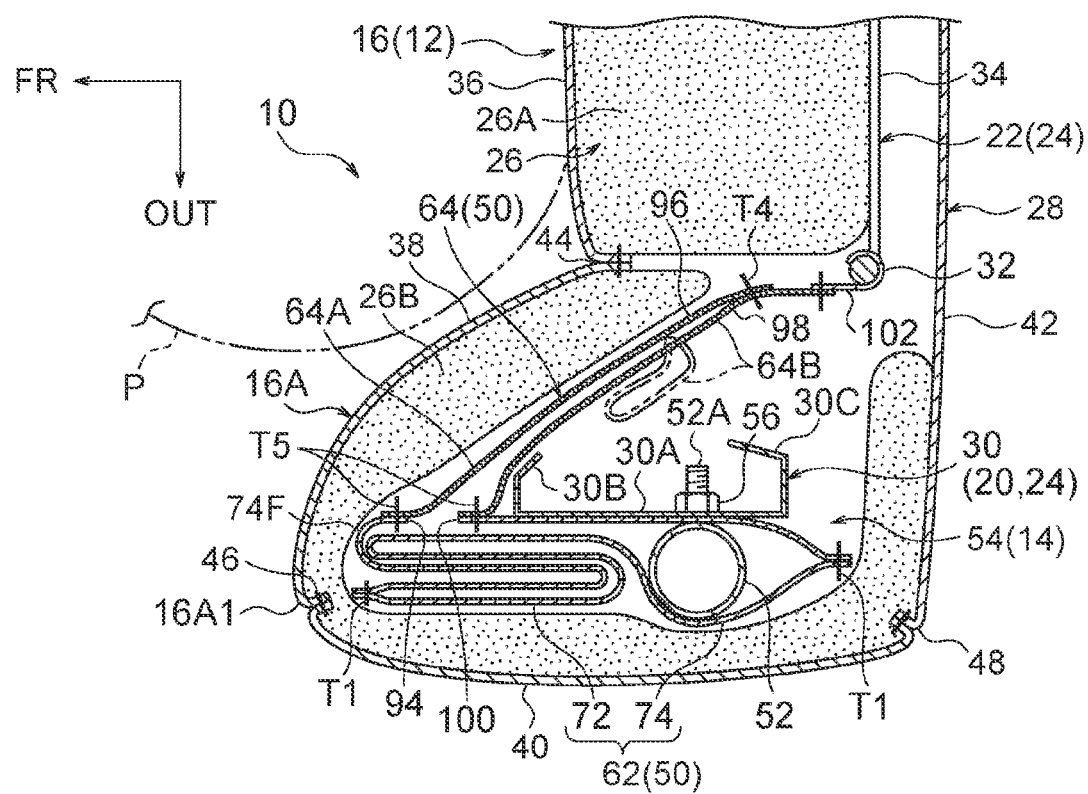
FIG. 3 is a cross-section corresponding to FIG. 2, illustrating a stowed state of a side airbag main body and an inner bag section.

As illustrated in FIG. 1 to FIG. 3 and so on, the seatback 16 includes a metal seatback frame 20, this being a framework member, and seatback springs 22 that are attached to the seatback frame 20 (see FIG. 3). The seatback frame 20 and the seatback springs 22 configure a frame section 24 of the seatback 16. The seatback 16 also includes a seatback pad 26 covering the frame section 24 (see FIG. 3; not illustrated other than in FIG. 3), and a seat cover 28 that covers the seatback pad 26 (see FIG. 3; not illustrated other than in FIG. 3).

The seatback frame 20 includes an outer side frame 30 provided inside a side section 16A on the vehicle width direction outer side of the seatback 16, an inner side frame provided inside a side section (neither of which are illustrated in the drawings) on the vehicle width direction inner side of the seatback 16, an upper frame, not illustrated in the drawings, connecting upper end portions of the outer side frame 30 and the inner side frame together, and a lower frame, not illustrated in the drawings, connecting lower end portions of the outer side frame 30 and the inner side frame together, along the seat width direction. The outer side frame 30 corresponds to a "side frame" of the present disclosure.

As illustrated in FIG. 2, FIG. 3, and so on, the outer side frame 30 is configured by a side wall portion 30A, a front flange portion 30B, and a rear flange portion 30C. As viewed along the height direction of the seatback 16, the side wall portion 30A extends along the front-rear direction of the seatback 16. The front flange portion 30B extends from a front end of the side wall portion 30A toward the seat width direction inner side, and a leading end side of the front flange portion 30B is bent obliquely toward the seat rear side. The rear flange portion 30C extends from a rear end of the side wall portion 30A toward the seat width direction inner side, and a leading end side of the rear flange portion 30C is bent obliquely toward the seat front side. Note that the inner side frame is configured similarly to the outer side frame 30, but with left-right symmetry thereto.

The seatback springs 22 illustrated in FIG. 3 are referred to as a spring mat, a flat mat, and so on, and are installed at the seat width direction center side and seat rear side inside the seatback 16. The seatback springs 22 are configured by a left and right pair of side wires 32 extending along the height direction of the seatback 16, and plural S springs 34 that span between the left and right side wires 32 (not illustrated in the drawings other than in FIG. 3). Upper end portions of the left and right side wires 32 are anchored to the upper frame previously described. Vertical direction intermediate portions of the left and right side wires 32 are coupled to the outer side frame 30 and the inner side frame by plural hook members, not illustrated in the drawings.

The seatback pad 26 illustrated in FIG. 3 is formed from a foamed body such as a urethane foam, and is configured by a pad central section 26A and a pair of left and right pad side sections 26B (the pad side section 26B on the vehicle width direction inner side is not illustrated in the drawings). The pad central section 26A is installed at the width direction central side of the seatback 16, and is supported from the seat rear side by the seatback springs 22. The left and right pad side sections 26B are each formed with a substantially C-shaped horizontal cross-section profile, and internally house the outer side frame 30 and the inner side frame respectively. The pad side sections 26B protrude out further toward the seat front side than the pad central section 26A, and are shaped so as to secure side support performance with respect to the occupant P.

The seat cover 28 illustrated in FIG. 3 includes a front cover 36 covering the pad central section 26A from the seat front side, front side covers 38 covering the pad side sections 26B from the seat front side, a side cover 40 covering the respective pad side section 26B from the seat width direction outer side and the seat rear side, and a rear cover 42 covering the pad central section 26A from the seat rear side.

Each of the front side covers 38 is stitched to the front cover 36 at a stitching portion 44, and is stitched to the side cover 40 at a stitching portion 46. The side cover 40 is stitched to the rear cover 42 at a stitching portion 48. The stitching portion 46 between the front side cover 38 and the respective side cover 40 is positioned at a front edge portion 16A1 (what is referred to as a frame portion) of the side section 16A. The stitching portion 46 is configured so as to split open together with the pad side section 26B when a side airbag main body 62, described later, inflates and deploys.

Side Airbag Device 14 Configuration

As illustrated in FIG. 1 to FIG. 3 and so on, the side airbag device 14 includes a side airbag 50 and an inflator 52. The side airbag 50 inflates and deploys on receiving gas supplied from the inflator 52 (the state illustrated in FIG. 1 and FIG. 2). The side airbag 50 and the inflator 52 are ordinarily configured as an airbag module 54, illustrated in FIG. 3, and stowed inside the side section 16A. Note that in the following explanation, the front, rear, up, and down directions of the side airbag 50 refer to the directions in an inflated and deployed state of the side airbag 50, and substantially correspond to the front, rear, up, and down directions of the seatback 16.

The inflator 52 is what is referred to as a cylinder type inflator, and is formed in a circular column shape. The inflator 52 is installed at the seat width direction outer side (vehicle width direction outer side) of the side wall portion 30A of the outer side frame 30, in an orientation in which its axial direction runs along the height direction of the seatback 16. An upper and lower pair of stud bolts 52A (see FIG. 2 and FIG. 3) project out from an outer peripheral portion of the inflator 52 toward the seat width direction inner side. The stud bolts 52A penetrate the side wall portion 30A, and nuts 56 are screwed onto leading end sides of the stud bolts 52A. The inflator 52 is thereby attached (fastened and fixed) to the outer side frame 30. Note that a configuration may be applied in which stud bolts projecting out from the outer peripheral portion of the inflator 52 toward the vehicle rear side penetrate a bracket or the like fixed to the outer side frame 30 from the vehicle front side, and are screwed into nuts (what is referred to as back face fastening).

Plural gas ejection ports (not illustrated in the drawings) are formed in a row around a circumferential direction of the inflator 52 at an upper end portion or a lower end portion of the inflator 52 (at a lower end portion in this example). Gas is ejected through the plural gas ejection ports in a radial pattern when the inflator 52 is actuated (operated). As illustrated in FIG. 1, the inflator 52 is electrically connected to a side collision ECU 58 installed in the vehicle. A side collision sensor 60 that detects a side-on collision is also electrically connected to the side collision ECU 58. The side collision ECU 58 is configured so as to actuate the inflator 52 on detection of (the inevitability of) a side-on collision based on a signal from the side collision sensor 60. Note that in cases in which a collision prediction sensor (pre-crash sensor) that predicts (foresees) a side-on collision is electrically connected to the side collision ECU 58, configuration may be made such that the side collision ECU 58 actuates the inflator 52 when a side-on collision has been predicted based on a signal from the collision prediction sensor.

The side airbag 50 is configured by a side airbag main body 62 and an inner bag section 64. The side airbag main body 62 inflates and deploys toward the seat front side of the side section 16A on receiving gas supplied from internally housed the inflator 52, so as to be present between the occupant P and a vehicle body side section (a door trim 63 of a side door and a B pillar garnish 65, illustrated in FIG. 2, in this example). The inner bag section 64 is supplied with gas from the inflator 52 through the side airbag main body 62, and inflates within the side section 16A. Note that the door trim 63 and the B pillar garnish 65 are not illustrated in the drawings, other than in FIG. 2.

The side airbag main body 62 is disposed at the seat width direction outer side of the outer side frame 30. The side airbag main body 62 is formed in a bag shape, for example by overlapping and stitching together outer peripheral edge portions of two base cloths 66, 68, formed by cutting out substantially elliptical shapes from a nylon-based or polyester-based fabric, at a stitching portion T1 (see FIG. 2 to FIG. 4; not illustrated or labelled in the other drawings).

Note that the manufacturing method of the side airbag main body 62 is not limited to that described above, and appropriate modifications may be made thereto. For example, the side airbag main body 62 may be manufactured by folding a single base cloth in two and stitching together at outer peripheral edge portions. As another example, the side airbag main body 62 may be manufactured using a hollow weaving method (what is referred to as an OPW method) using an automatic loom. Similar also applies to the inner bag section 64, described later.

As illustrated in FIG. 2, in an inflated and deployed state of the side airbag main body 62, one base cloth 66 is installed facing the seat width direction inner side (occupant P side), and the other base cloth 68 is installed facing the seat width direction outer side (the door trim 63 and B pillar garnish 65 side). As illustrated in FIG. 1, as viewed from the side in the inflated and deployed state, the side airbag main body 62 is formed in a substantially elliptical elongated shape along the height direction of the seatback 16, and is formed with a size capable of restraining the shoulder S, chest C, belly B, and lumbar region L of the occupant P.

The side airbag main body 62 is partitioned into a front bag section 72 and a rear bag section 74 by an internally provided tether 70 (partitioning cloth; not illustrated in FIG. 3). The tether 70 is formed in an elongated strap shape using a similar fabric to that of the base cloths 66, 68. One long side edge portion of the tether 70 is stitched to the base cloth 66 at a stitching portion T2 (see FIG. 2; not illustrated in FIG. 3), and the other long side edge portion of the tether 70 is stitched to the base cloth 68 at a stitching portion T3 (see FIG. 2; not illustrated or not labeled in the other drawings).

The tether 70 is set so as to extend along the front edge portion 16A1 (referred to as a frame portion) of the side section 16A of the seatback 16 in the height direction of the seatback 16 in the inflated and deployed state of the side airbag main body 62. An upper side inner vent hole 76 is formed at an upper end portion of the tether 70, and a lower side inner vent hole 78 is formed at a lower end portion of the tether 70. The inside of the front bag section 72 and the inside of the rear bag section 74 are in communication with each other through the upper side inner vent hole 76 and the lower side inner vent hole 78.

Figure 4:
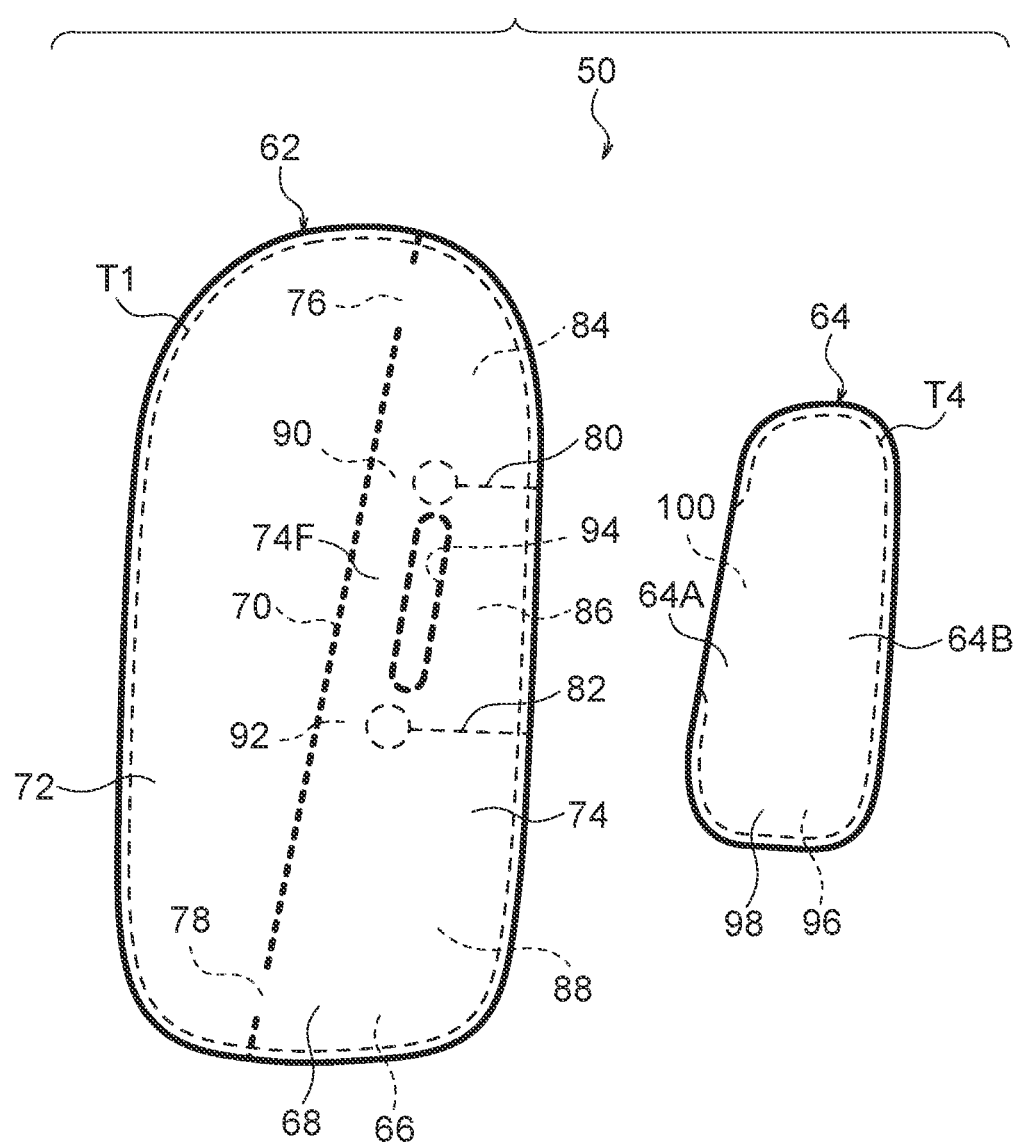
FIG. 4 is a plan view illustrating a side airbag main body and an inner bag section opened out in a state prior to joining the side airbag main body and the inner bag section together.

As illustrated in FIG. 1, FIG. 4, and so on, a pair of upper and lower partitioning portions 80, 82 are provided at a vertical direction intermediate portion of the rear bag section 74. The upper and lower partitioning portions 80, 82 are non-inflating portions configured by stitched portions (seams) where the base cloths 66, 68 of the side airbag main body 62 are stitched together, and extend from a rear end edge of the rear bag section 74 toward a front end edge of the rear bag section 74. Note that the upper and lower partitioning portions 80, 82 may be configured by partitioning cloth similar to that of the tether 70.

Terminal processing to prevent fraying is performed by stitching circular shapes at front end portions of the respective partitioning portions 80, 82. The rear bag section 74 is partitioned into an upper chamber 84, a vertical direction intermediate chamber 86, and a lower chamber 88 by the partitioning portions 80, 82. Note that the front end portions of the respective partitioning portions 80, 82 are positioned further toward a rear end of the rear bag section 74 than the tether 70. The inside of the upper chamber 84, the inside of the vertical direction intermediate chamber 86, and the inside of the lower chamber 88 are accordingly in communication with each other at a front portion 74F of the rear bag section 74. More specifically, the inside of the upper chamber 84 and the inside of the vertical direction intermediate chamber 86 are in communication with each other through a communication path 90 formed between the front end portion of the partitioning portion 80 and the tether 70, and the inside of the vertical direction intermediate chamber 86 and the inside of the lower chamber 88 are in communication with each other through a communication path 92 formed between the front end portion of the partitioning portion 82 and the tether 70.

The upper chamber 84 is in communication with the inside of the front bag section 72 through the upper side inner vent hole 76 described above, and the lower chamber 88 is in communication with the inside of the front bag section 72 through the lower side inner vent hole 78 described above. The upper side inner vent hole 76 is at a position at a separation toward an upper end of the side airbag 50 with respect to the upper side partitioning portion 80, and the lower side inner vent hole 78 is at a position at a separation toward a lower end of the side airbag main body 62 with respect to the lower side partitioning portion 82. The inflator 52 described above is housed at a rear end portion inside the vertical direction intermediate chamber 86. The upper and lower stud bolts 52A of the inflator 52 penetrate the base cloth 66, such that the side airbag main body 62 is fastened and fixed to a vertical direction intermediate portion of the side wall portion 30A through the inflator 52.

As illustrated in FIG. 3, a front section location of the side airbag main body 62 configured as described above, including the front bag section 72, is normally stowed at the seat width direction outer side of the outer side frame 30, in a state folded into a concertina shape with overlapping folds in the seat width direction.

In the inflated and deployed state of the side airbag main body 62, as illustrated in FIG. 1, the front bag section 72 restrains a front region side of the occupant P from the shoulder S to the lumbar region L, and the rear bag section 74 restrains a rear region side of the occupant P from the shoulder S to the lumbar region L. The rear bag section 74 is configured such that at least a location of the rear bag section 74 further upward than the vicinity of the waist of the occupant P is positioned further to the seat rear side than the front edge portion 16A1 of the side section 16A of the seatback 16. However, the front portion 74F of the rear bag section 74 is configured so as to be positioned further to the seat front side than the front flange portion 30B of the outer side frame 30 (a front end portion of the outer side frame 30) in the inflated and deployed state of the side airbag 50.

Note that in the present exemplary embodiment, as illustrated in FIG. 3, configuration is such that the front portion 74F of the rear bag section 74 is positioned further toward the seat front side than the front flange portion 30B, even in the folded state of the side airbag main body 62; however, there is no limitation thereto. Namely, configuration may be such that the front portion 74F of the rear bag section 74 is positioned further toward the seat rear side than the front flange portion 30B in the folded state of the side airbag main body 62.

The side airbag main body 62 is formed with a communication port 94 at a location that faces the seat width direction inner side and configures the front portion 74F of the rear bag section 74 in the inflated and deployed state (at the center of the base cloth 66 in this example). The communication port 94 is formed in an elongated shape (an elliptical shape in this example) with its length running along the vertical direction of the side airbag main body 62, and is positioned at a vertical direction intermediate portion of the rear bag section 74. The communication port 94 is formed at a position overlapping with a front portion of the vertical direction intermediate chamber 86 as viewed from the side in the inflated and deployed state of the side airbag main body 62. The communication port 94 is aligned with the inner bag section 64.

The inner bag section 64 is formed in a bag shape by overlapping and stitching together outer peripheral edge portions of two base cloths 96, 98, formed by cutting out substantially elliptical shapes from a fabric similar to that of the base cloths 66, 68, at a stitching portion T4 (see FIG. 2 to FIG. 4; not illustrated in FIG. 1). The inner bag section 64 is set with a vertical direction dimension and a front-rear direction dimension sufficiently smaller than those of the side airbag main body 62, and is formed with a volume sufficiently smaller than that of the side airbag main body 62.

The stitching portion T4 is absent from a base end portion 64A of the inner bag section 64 (one long side edge portion; front end portion). An opening 100 is thereby formed at the base end portion 64A of the inner bag section 64. An edge portion of the opening 100 of the inner bag section 64 is stitched (joined) to a peripheral edge portion of the communication port 94 at a stitching portion T5, illustrated in FIG. 2. The base end portion 64A of the inner bag section 64 is thereby joined to the front portion 74F of the rear bag section 74, and the inside of the front portion 74F of the rear bag section 74 and the inside of the inner bag section 64 are in communication with each other through the communication port 94. Specifically, the communication port 94 places the inside of the front portion of the vertical direction intermediate chamber 86 in the rear bag section 74 in communication with the inside of the inner bag section 64, such that the inside of the vertical direction intermediate chamber 86 and the inside of the inner bag section 64 are in communication with each other directly, and not through the inside of the upper chamber 84 and the inside of the lower chamber 88.

The inner bag section 64 extends from the front portion 74F of the rear bag section 74 past the seat front of the front flange portion 30B, and extends to the seat width direction inner side of the outer side frame 30. The inner bag section 64 extends obliquely toward the seat rear side and seat width direction inner side at the seat width direction inner side of the outer side frame 30. As illustrated in FIG. 3, the inner bag section 64 is configured so as to be housed inside the side section 16A in a state spread out in a flat shape, and is interposed between the outer side frame 30 and the seatback pad 26 at the seat width direction inner side of the outer side frame 30.

A hook member 102 formed of resin or metal is fixed to a leading end portion 64B (rear end portion) of the inner bag section 64 by a means such as stitching. The hook member 102 is formed with a substantially J-shaped cross-section, is hooked onto the side wire 32 at the vehicle width direction outer side of the seatback springs 22 previously described, and is fixed to this side wire 32. Thus, the leading end portion 64B of the inner bag section 64 is coupled to the side wire 32, namely, to part of the frame section 24, at a rear portion side (back portion side) inside the seatback 16.

Note that the coupling method of the leading end portion 64B of the inner bag section 64 to the frame section 24 is not limited to that described above, and appropriate modifications may be made thereto. A method employing a fastener, for example, may be employed. A configuration may also be employed in which the leading end portion 64B of the inner bag section 64 is not coupled to the frame section 24. In such a case, for example, the leading end portion 64B of the inner bag section 64 may be folded in two at the seat width direction outer side, as illustrated by the double-dotted dashed line in FIG. 3.

As viewed from the side of the seat, the inner bag section 64 is installed so as to face the rear region side of the chest C and the belly B of the occupant P (a region at the side of the back, including a rear region side of the ribs) from the seat width direction outer side, as illustrated in FIG. 1. The inner bag section 64 configured as described above is internally supplied with gas generated by the inflator 52 inside the rear bag section 74 through the communication port 94, and inflates within the side section 16A. The inflated inner bag section 64 receives a reaction force from the front flange portion 30B of the outer side frame 30, and inflates toward the seat width direction inner side (the occupant P side) (see FIG. 2). Accordingly, configuration is made in which the rear region side of the chest C and the belly B of the occupant P are restrained by the inner bag section 64 through the seatback pad 26 and the seat cover 28. Note that it is sufficient that the inner bag section 64 be capable of restraining at least the rear region side of the chest C (the rear region side of the ribs).

Explanation follows regarding a manner in which gas flows inside the side airbag 50 when the inflator 52 has been actuated, with reference to FIG. 5A to FIG. 8B. Note that in FIG. 5A to FIG. 8B, in order to facilitate explanation, a state is illustrated in which the side airbag main body 62 has inflated and deployed and the inner bag section 64 has inflated, and regions of the side airbag 50 to which gas has been supplied are shaded with dots. FIG. 5A to FIG. 8B are schematic diagrams for explaining the manner in which gas flows inside the side airbag 50, and do not illustrate a sequence in which respective portions of the side airbag 50 are inflated. Reference numerals have been omitted from FIG. 5A to FIG. 8B as appropriate in order to facilitate viewing of the drawings.

Figure 5A:
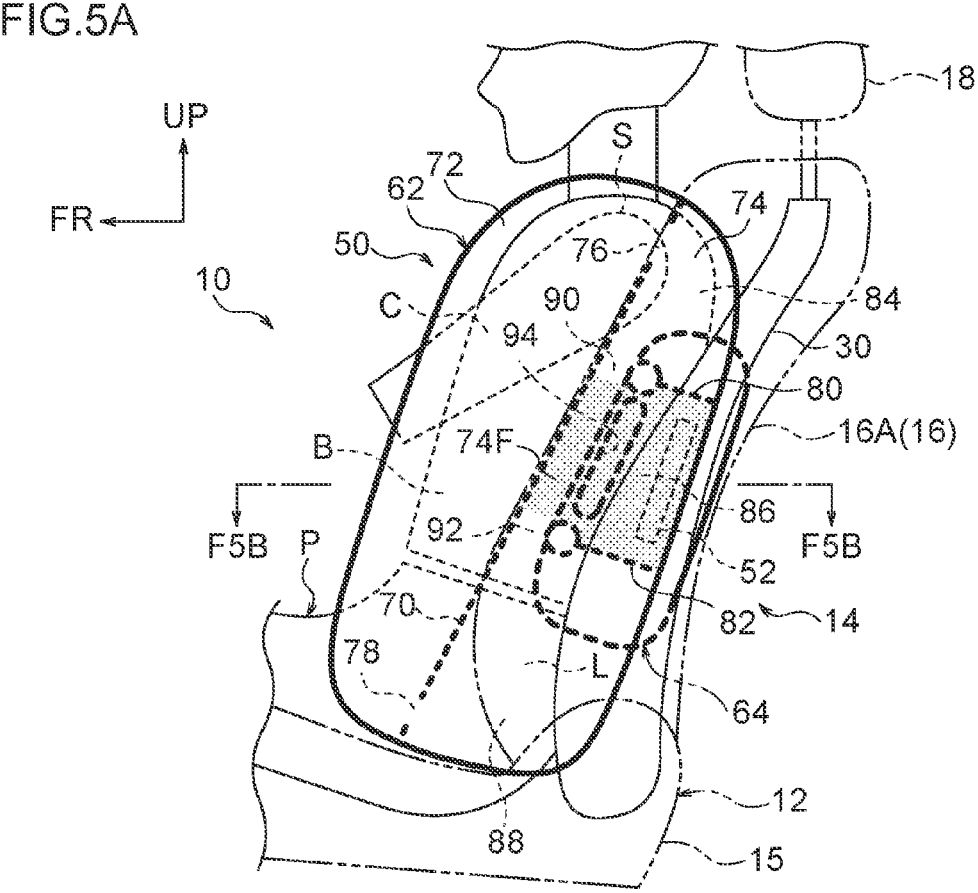
FIG. 5A is a side view corresponding to FIG. 1, schematically illustrating a state in which gas has been supplied into a vertical direction intermediate chamber of a rear bag section of a side airbag main body.
Figure 5B:
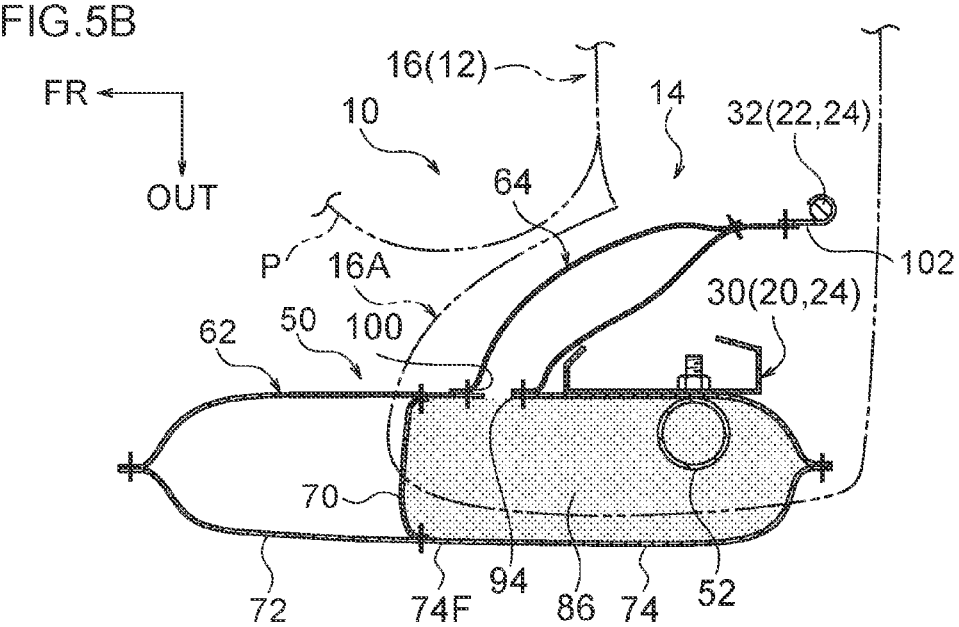
FIG. 5B is a cross-section illustrating relevant portions in close-up in a cross-section taken along line F5B-F5B in FIG. 5A.

In the side airbag 50 with the above configuration, the inflator 52 is housed inside the vertical direction intermediate chamber 86 of the rear bag section 74 of the side airbag main body 62. Thus, as illustrated in FIG. 5A and FIG. 5B, gas is first supplied into the vertical direction intermediate chamber 86 when the inflator 52 is actuated. The vertical direction intermediate chamber 86 inflates accordingly.

Figure 6A:
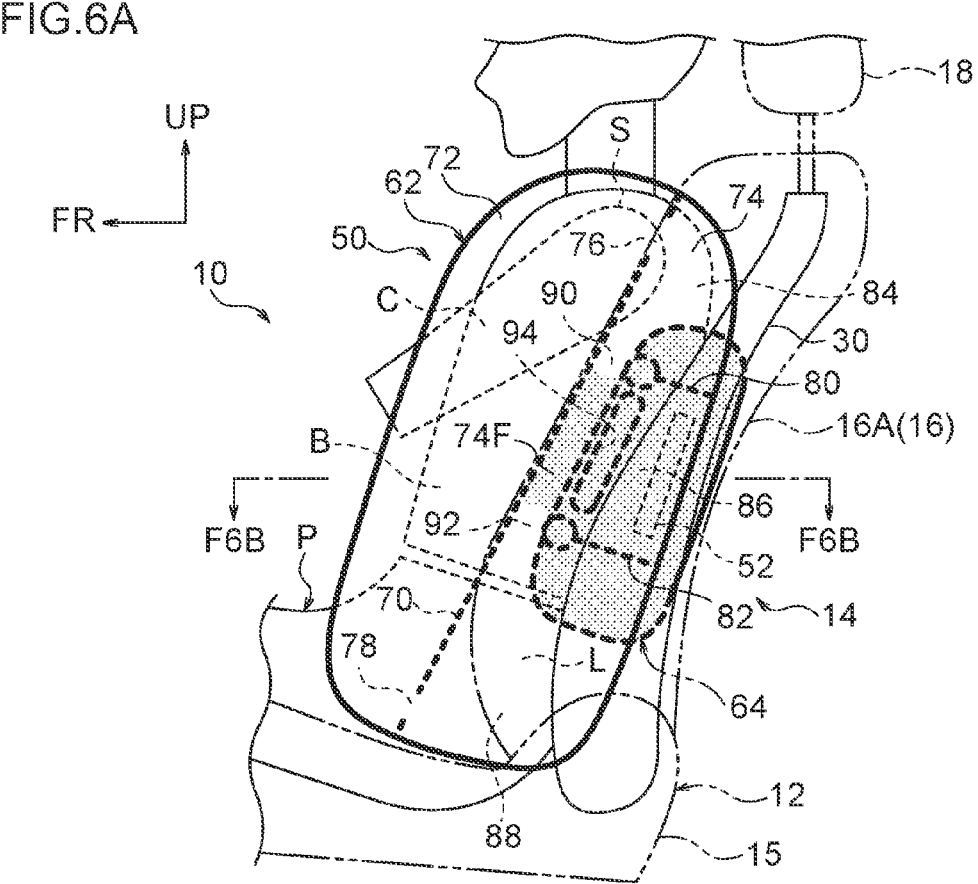
FIG. 6A is a side view corresponding to FIG. 1, schematically illustrating a state in which gas has been supplied into an inner bag section.
Figure 6B:
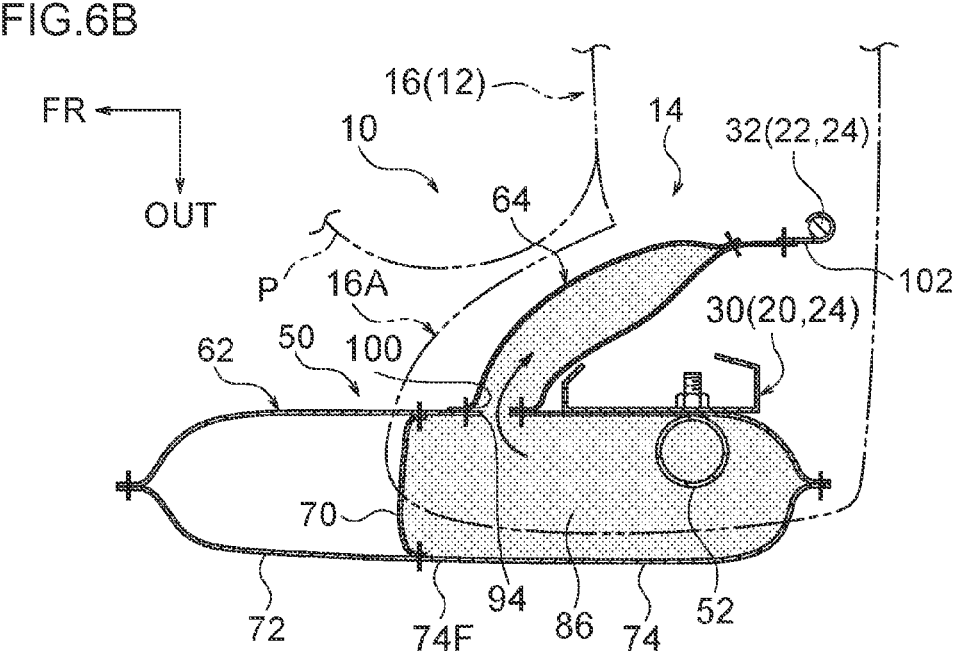
FIG. 6B is a cross-section illustrating relevant portions in close-up in a cross-section taken along line F6B-F6B in FIG. 6A.

Next, as illustrated in FIG. 6A and FIG. 6B, some of the gas that has been supplied into the vertical direction intermediate chamber 86 is supplied into the inner bag section 64 through the communication port 94. The inner bag section 64 inflates accordingly.

Figure 7A:
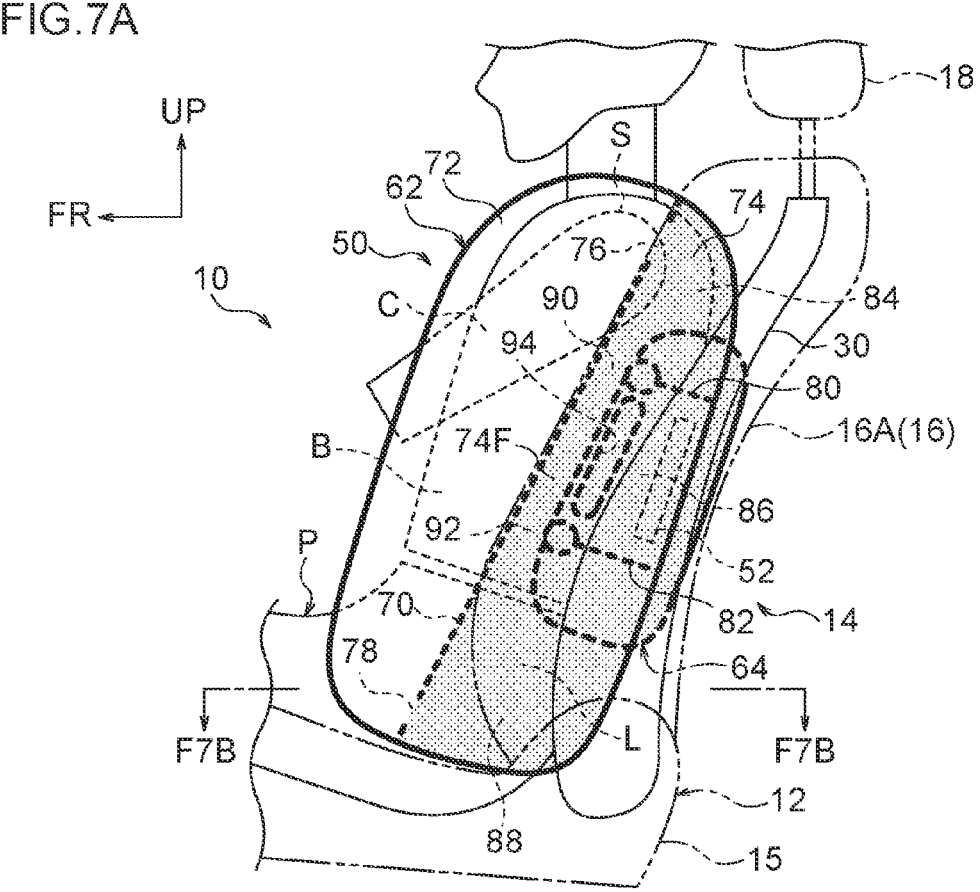
FIG. 7A is a side view corresponding to FIG. 1, schematically illustrating a state in which gas has been supplied into an upper chamber and into a lower chamber of a rear bag section of a side airbag main body.
Figure 7B:
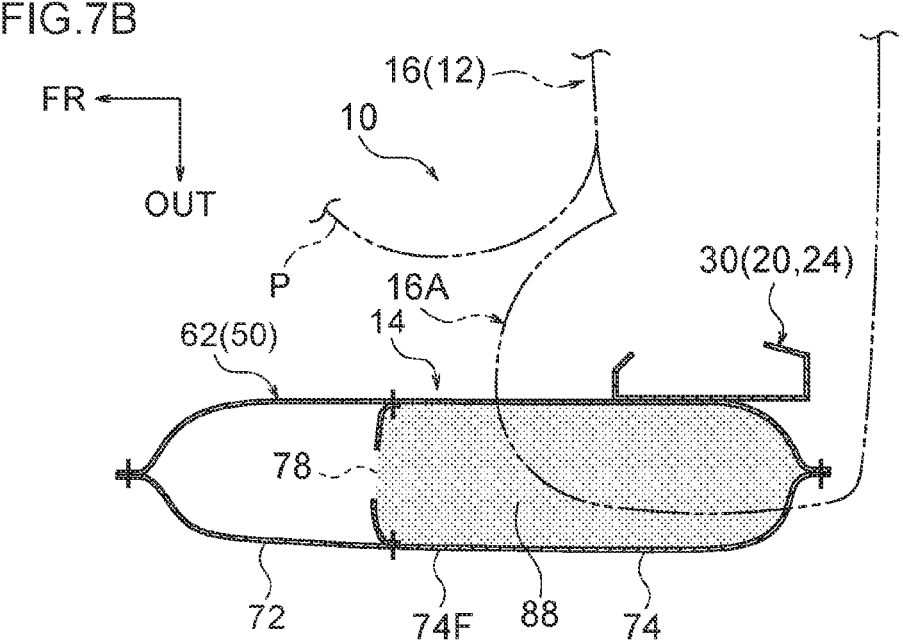
FIG. 7B is a cross-section illustrating relevant portions in close-up in a cross-section taken along line F7B-F7B in FIG. 7A.

Next, as illustrated in FIG. 7A and FIG. 7B, some of the gas that has been supplied into the vertical direction intermediate chamber 86 is supplied into the upper chamber 84 and the lower chamber 88 of the rear bag section 74 through the communication paths 90, 92. The upper chamber 84 and the lower chamber 88 inflate accordingly. Note that the timing at which gas is supplied into the upper chamber 84 and into the lower chamber 88 may be adjusted by changing the cross-sectional areas of the communication paths 90, 92, by changing the positions of the front end portions of the upper and lower partitioning portions 80, 82.

Figure 8A:
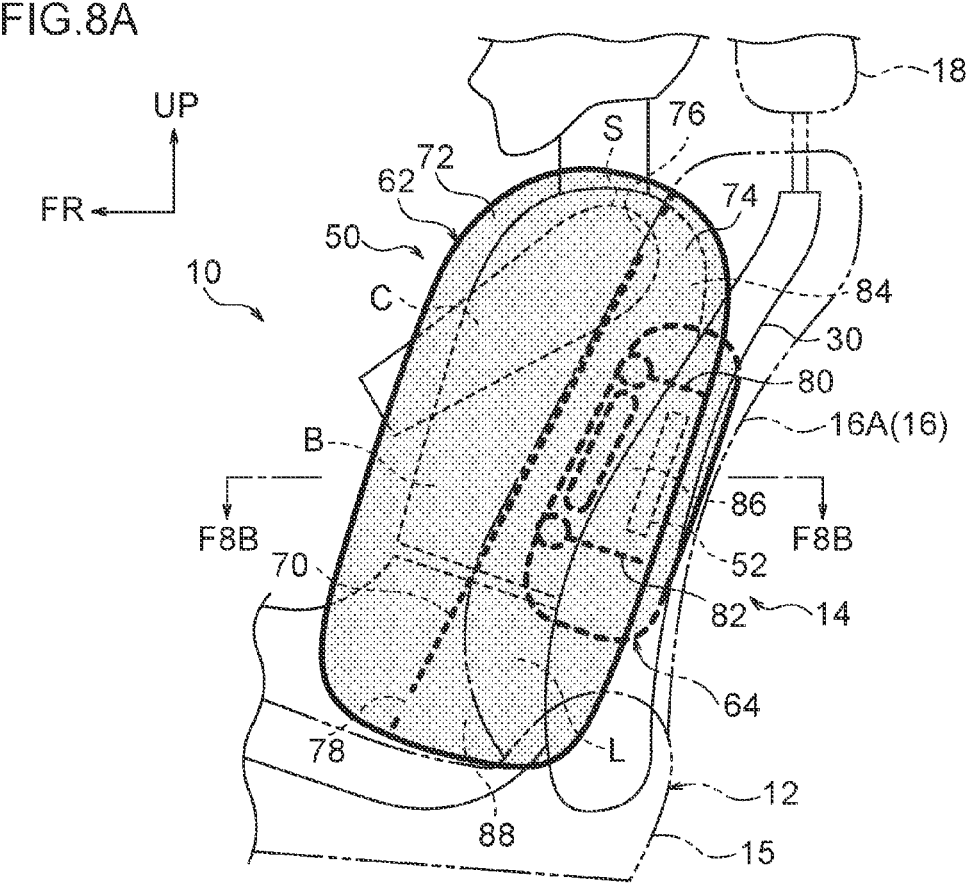
FIG. 8A is a side view corresponding to FIG. 1, schematically illustrating a state in which gas has been supplied into a front bag section of a side airbag main body.
Figure 8B:
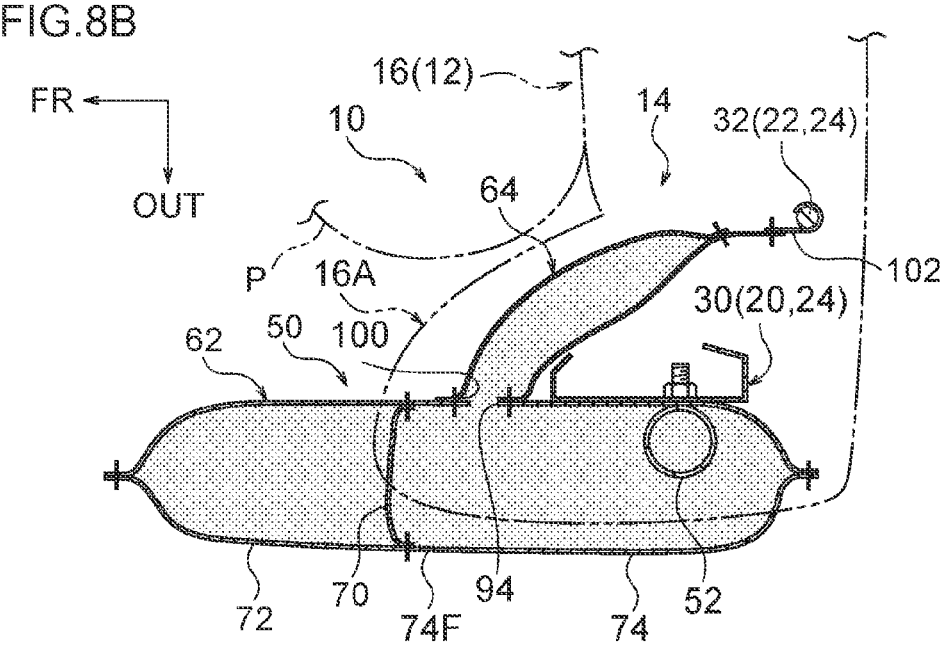
FIG. 8B is a cross-section illustrating relevant portions in close-up in a cross-section taken along line F8B-F8B in FIG. 8A.

Next, as illustrated in FIG. 8A and FIG. 8B, some of the gas that has been supplied into the upper chamber 84 and into the lower chamber 88 is supplied into the front bag section 72 through the upper side inner vent hole 76 and the lower side inner vent hole 78. The front bag section 72 inflates accordingly.

Operation and Advantageous Effects

Explanation follows regarding operation and advantageous effects of the present exemplary embodiment.

In the present exemplary embodiment, when the side collision ECU 58 detects a side-on collision based on a signal from the side collision sensor 60, the inflator 52 housed inside the rear bag section 74 of the side airbag main body 62 is actuated by the side collision ECU 58. Gas from the inflator 52 is accordingly supplied into the rear bag section 74. The rear bag section 74 inflates and deploys, and the inner bag section 64, of which an internal portion is in communication with the inside of the front portion 74F of the rear bag section 74, receives gas supplied from inside the rear bag section 74 and inflates within the side section 16A of the seatback 16. Gas supplied into the rear bag section 74 passes through the upper side inner vent hole 76 and the lower side inner vent hole 78 and is supplied into the front bag section 72, and the front bag section 72 inflates and deploys.

Note that in the present exemplary embodiment, the inflator 52 is housed inside the rear bag section 74 of the side airbag main body 62, thereby enabling gas to be supplied to the side airbag main body 62 earlier than in configurations in which the inflator 52 is housed inside the inner bag section 64. Moreover, since configuration is such that the side airbag main body 62 is stowed on the seat width direction outer side of the outer side frame 30, the side airbag main body 62 is less liable to impinge on the occupant P during deployment than in configurations in which the side airbag main body 62 is stowed on the seat width direction inner side of the outer side frame 30. This thereby enables deployment performance of the side airbag main body 62 to be improved.

In the rear bag section 74 of the side airbag main body 62, the front portion 74F of the side airbag main body 62 is positioned further to the seat front side than the front flange portion 30B of the outer side frame 30, at least in the inflated and deployed state of the side airbag main body 62. The inner bag section 64 extends out from inside the front portion 74F of the rear bag section 74, past the seat front of the front flange portion 30B of the outer side frame 30, to the seat width direction inner side of the outer side frame 30. The internal portion of the inner bag section 64 is in communication with the inside of the front portion 74F of the rear bag section 74. Accordingly, a gas supply route from inside the front portion 74F of the rear bag section 74 into the inner bag section 64 can be configured without a sharp bend at the seat front of the outer side frame 30, thereby enabling a smooth supply of gas from inside the front portion 74F of the rear bag section 74 into the inner bag section 64. This thereby enables early inflation of the inner bag section 64. The inflated inner bag section 64 receives a reaction force from the front flange portion 30B and is inflated toward the seat width direction inner side (namely, the side of the occupant P leaning against the seatback 16). This enables early restraint of the occupant P by the inner bag section 64.

Accordingly, the present exemplary embodiment enables both deployment performance of the side airbag main body 62 and early restraint performance of the occupant P to be achieved. Moreover, since the occupant restraint performance is improved by the inner bag section 64, there is no need to provide the side airbag main body 62 with additional inflation thickness in the vehicle width direction in order to improve the occupant restraint performance. This thereby enables good deployment performance of the side airbag main body 62 to be secured in a narrow gap between the door trim 63 and B pillar garnish 65, and the occupant P.

Note that as a measure to improve occupant restraint performance, consideration may be given to increasing the size of the side airbag main body 62, or inflating the side airbag main body 62 to a higher pressure by increasing the output of the inflator 52. However, such measures make it difficult to secure injury reduction performance with respect to an occupant positioned in a non-standard position, this being a region where the side airbag main body 62 inflates and deploys (what is referred to as out-of-position (OOP) performance). Regarding this point, the inner bag section 64 according to the present exemplary embodiment inflates within the side section 16A, such that there is a low degree of injury to an occupant in a non-standard position. Moreover, increasing the output of the inflator 52 is a measure that incurs an increase in costs due to increasing the size of the inflator 52, whereas the present exemplary embodiment enables such an increase in costs to be avoided.

In the present exemplary embodiment, in the side airbag main body 62, the rear bag section 74 that houses the inflator 52 inflates and deploys earlier, and at a higher pressure, than the front bag section 72. In the inflated and deployed state, a location of the rear bag section 74 further upward than the vicinity of the waist of the occupant P is positioned further to the seat rear side than the front edge portion 16A1 of the side section 16A of the seatback 16. This thereby enables the effects imparted to an occupant in a non-standard position by the high pressure rear bag section 74 to be lessened.

In the present exemplary embodiment, the inflated inner bag section 64 is supported from the opposite side to the occupant P by the front flange portion 30B of the outer side frame 30. The front flange portion 30B is positioned closer to the occupant P than the rear flange portion 30C. This enables occupant restraining force by the inner bag section 64 to be improved, compared to configurations in which the inflated inner bag section 64 is supported from the opposite side to the occupant P by the rear flange portion 30C.

Moreover, in the present exemplary embodiment, the inner bag section 64 formed by the base cloths 96, 98, these being separate from the base cloths 66, 68 of the side airbag main body 62, is joined to the side airbag main body 62. Accordingly, for example, the side airbag main body 62 may employ an existing side airbag that is partitioned into a front bag section and a rear bag section (what is referred to as a front-rear dual chamber side airbag) with only slight modifications (such as forming the communication port 94).

In the present exemplary embodiment, the leading end portion 64B of the inner bag section 64 is coupled to the side wire 32 of the seatback springs 22. This enables the inner bag section 64 to not be offset from a specific position when covering the frame section 24, including the metal seatback frame 20 assembled with the airbag module 54 and the seatback springs 22, with the seatback pad 26. Moreover, reaction force from the frame section 24 can be imparted to the leading end portion 64B of the inner bag section 64 during inflation of the inner bag section 64, thereby enabling restraining force on the occupant P by the inner bag section 64 to be improved.

In the present exemplary embodiment, the rear bag section 74 is partitioned into the upper chamber 84, the vertical direction intermediate chamber 86, and the lower chamber 88 that are in communication with each other at the front portion 74F side. The inflator 52 places the inside of the vertical direction intermediate chamber 86 and the inside of the inner bag section 64 in communication with each other directly, and not through the upper chamber 84 and the lower chamber 88. Accordingly, gas generated by the inflator 52 inside the vertical direction intermediate chamber 86 is supplied into the inner bag section 64 without passing through the inside of the upper chamber 84 and the inside of the lower chamber 88. This thereby enables gas to be supplied into the inner bag section 64 earlier than in cases in which the rear bag section 74 is not partitioned as described above, enabling even earlier inflation of the inner bag section 64.

In the present exemplary embodiment, the inside of the upper chamber 84 of the rear bag section 74 and the inside of the front bag section 72 are in communication with each other through the upper side inner vent hole 76, and the inside of the lower chamber 88 of the rear bag section 74 and the inside of the front bag section 72 are in communication with each other through the lower side inner vent hole 78. Gas generated by the inflator 52 inside the vertical direction intermediate chamber 86 of the rear bag section 74 is distributed into the inner bag section 64, into the upper chamber 84, and into the lower chamber 88. Some of the gas distributed into the upper chamber 84 and into the lower chamber 88 is supplied into the front bag section 72 through the upper and lower inner vent holes 76, 78. The gas supply route to the inside of the front bag section 72 is accordingly lengthened, thereby enabling the supply of gas into the front bag section 72 to be slowed. This enables commensurate priority to be given to supplying gas into the inner bag section 64. This thereby enables even earlier inflation of the inner bag section 64.

In the present exemplary embodiment, the inner bag section 64 is stowed inside the side section 16A in a state spread out in a flat shape. This enables the inner bag section 64 to be inflated earlier than in cases in which the inner bag section 64 is stowed inside the side section 16A in a state folded in a concertina shape, for example.

Supplementary Explanation of First Exemplary Embodiment

Figure 9:
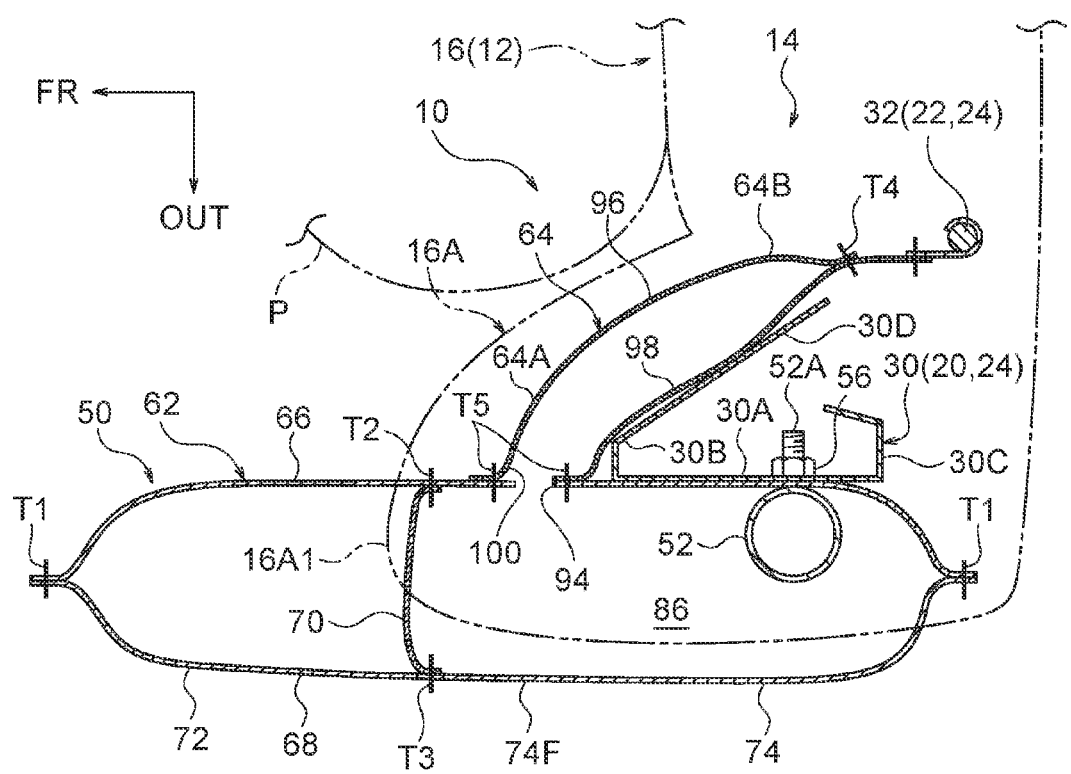
FIG. 9 is a cross-section corresponding to FIG. 2, illustrating a first modified example of the first exemplary embodiment.

The first exemplary embodiment may be configured with a reaction force plate portion 30D provided to the outer side frame 30, as in a first modified example illustrated in FIG. 9. The reaction force plate portion 30D extends out obliquely from a seat width direction inner side end portion of the front flange portion 30B toward the seat rear side and seat width direction inner side, and faces the inner bag section 64 from the seat width direction outer side. The reaction force plate portion 30D is only provided to a region of a vertical direction intermediate portion of the outer side frame 30 that overlaps the inner bag section 64 in a seat side view, and is set with an extension length from the front flange portion 30B such that a leading end portion (rear end portion) of the reaction force plate portion 30D overlaps the leading end portion 64B (rear end portion) of the inner bag section 64 in the seat width direction.

In the first modified example, the inner bag section 64 that inflates within the side section 16A receives a reaction force toward the seat width direction inner side (the occupant side) from the reaction force plate portion 30D, in addition to from the front flange portion 30B of the outer side frame 30. This enables the restraining force on the occupant P by the inner bag section 64 to be improved.

Figure 10:
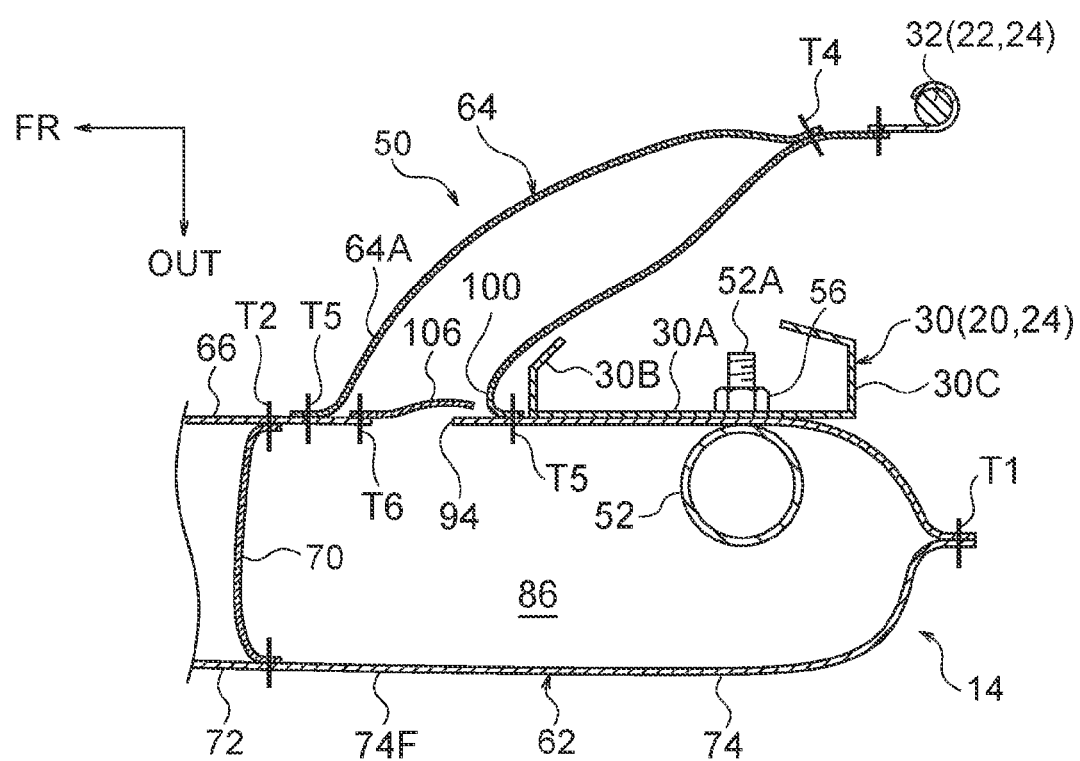
FIG. 10 is a cross-section corresponding to FIG. 2, illustrating a second modified example of the first exemplary embodiment.

The first exemplary embodiment may also be configured with a check valve 106 that is capable of opening and closing provided to the communication port 94, as in a second modified example illustrated in FIG. 10. The check valve 106 is formed in an elongated belt shape that is larger than the communication port 94 using similar cloth to the base cloths 66, 68, and is disposed inside the opening 100 of the inner bag section 64. One length side edge portion of the check valve 106 is stitched to an edge portion of the communication port 94 at a stitch portion T6. The check valve 106 permits gas to flow from inside the rear bag section 74 to inside the inner bag section 64 by opening the communication port 94, but restricts gas from flowing from inside the inner bag section 64 to inside the rear bag section 74 by closing off the communication port 94. Namely, when the internal pressure of the inner bag section 64 rises to a specific value or greater due to the flow of gas into the inner bag section 64, the check valve 106 is in close contact with the edge portion of the communication port 94 of the base cloth 66. Thus, the flow of gas from inside the inner bag section 64 to inside the rear bag section 74 is restricted, and a reduction in the internal pressure of the inner bag section 64 is prevented or suppressed.

In the second modified example, even in cases in which the inflator 52 is actuated based on a signal from a collision prediction sensor that predicts a side-on collision of the vehicle, and the side airbag main body 62 and the inner bag section 64 are inflated at an early stage, the internal pressure of the inner bag section 64 can be maintained by the check valve 106 until the occupant is restrained. This enables a sufficient occupant restraining force to be obtained by the inner bag section 64, even in cases in which there is coordination with a collision prediction sensor as described above.

Second Exemplary Embodiment

Next, explanation follows regarding a side airbag device-installed vehicle seat 110 according to a second exemplary embodiment of the present disclosure, with reference to FIG. 11 to FIG. 17B. Note that configurations and operation that are basically the same as those of the first exemplary embodiment are allocated the same reference numerals as in the first exemplary embodiment, and explanation thereof is omitted.

Figure 11:
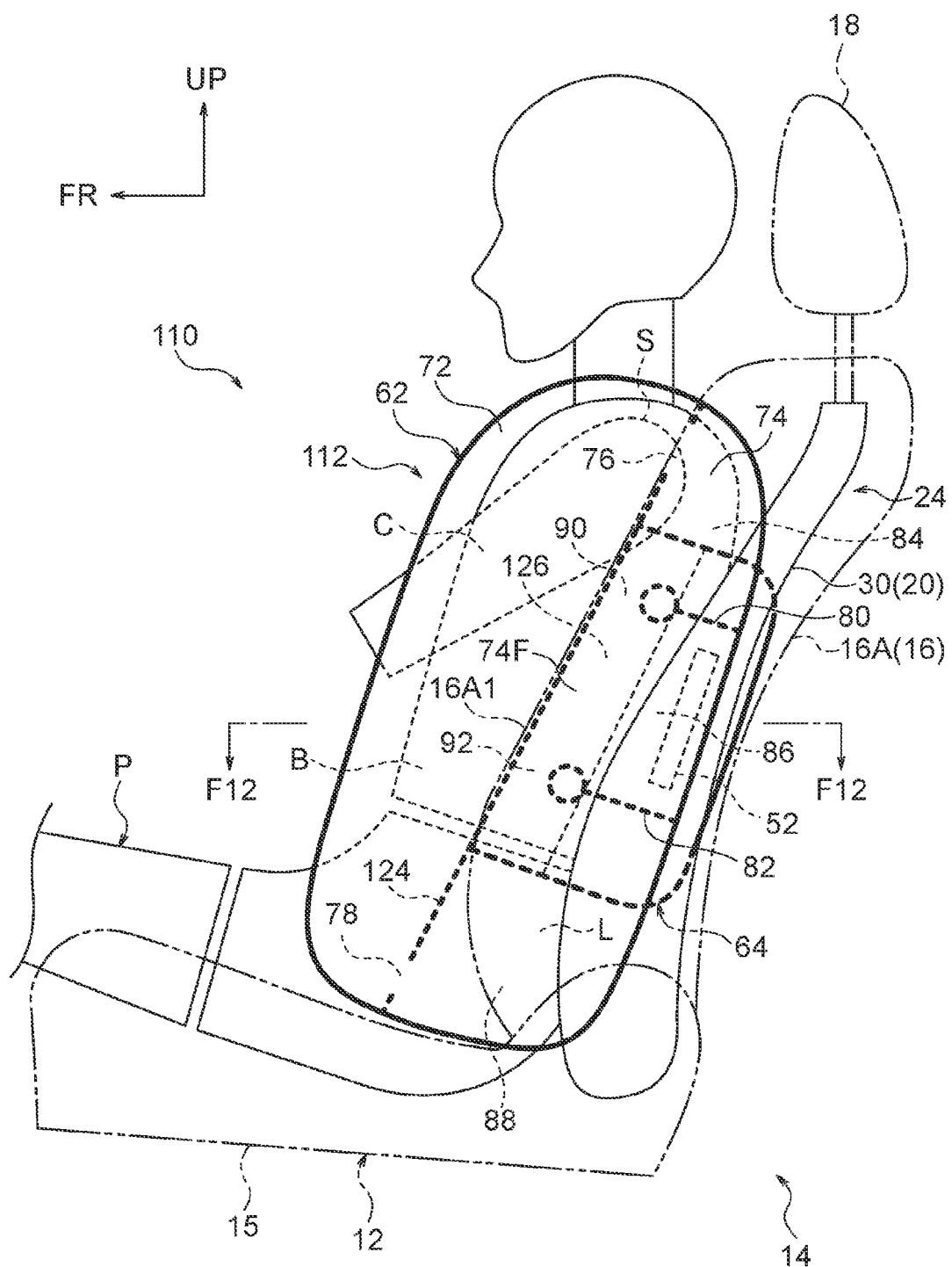
FIG. 11 is a side view of a side airbag device-installed vehicle seat according to a second exemplary embodiment of the present disclosure, illustrating a state in which a side airbag main body has inflated and deployed and an inner bag section has inflated.
Figure 12:
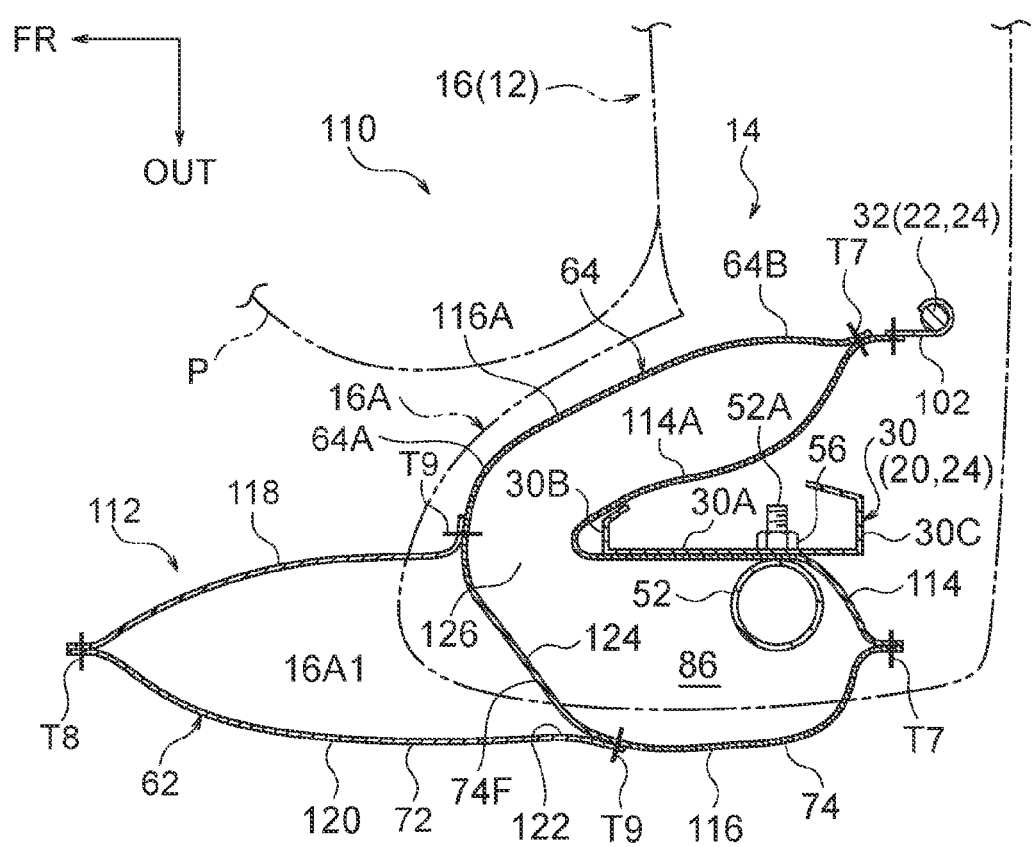
FIG. 12 is a cross-section illustrating relevant portions in close-up in a cross-section taken along line F12-F12 in FIG. 11.

In the present exemplary embodiment, the structure of a side airbag 112 differs from that of the side airbag 50 according to the first exemplary embodiment. Other configurations are basically the same as those of the first exemplary embodiment. As illustrated in FIG. 11, FIG. 12, and so on, the side airbag 112 is configured by a side airbag main body 62 and an inner bag section 64, similarly to the side airbag 50.

Figure 13:
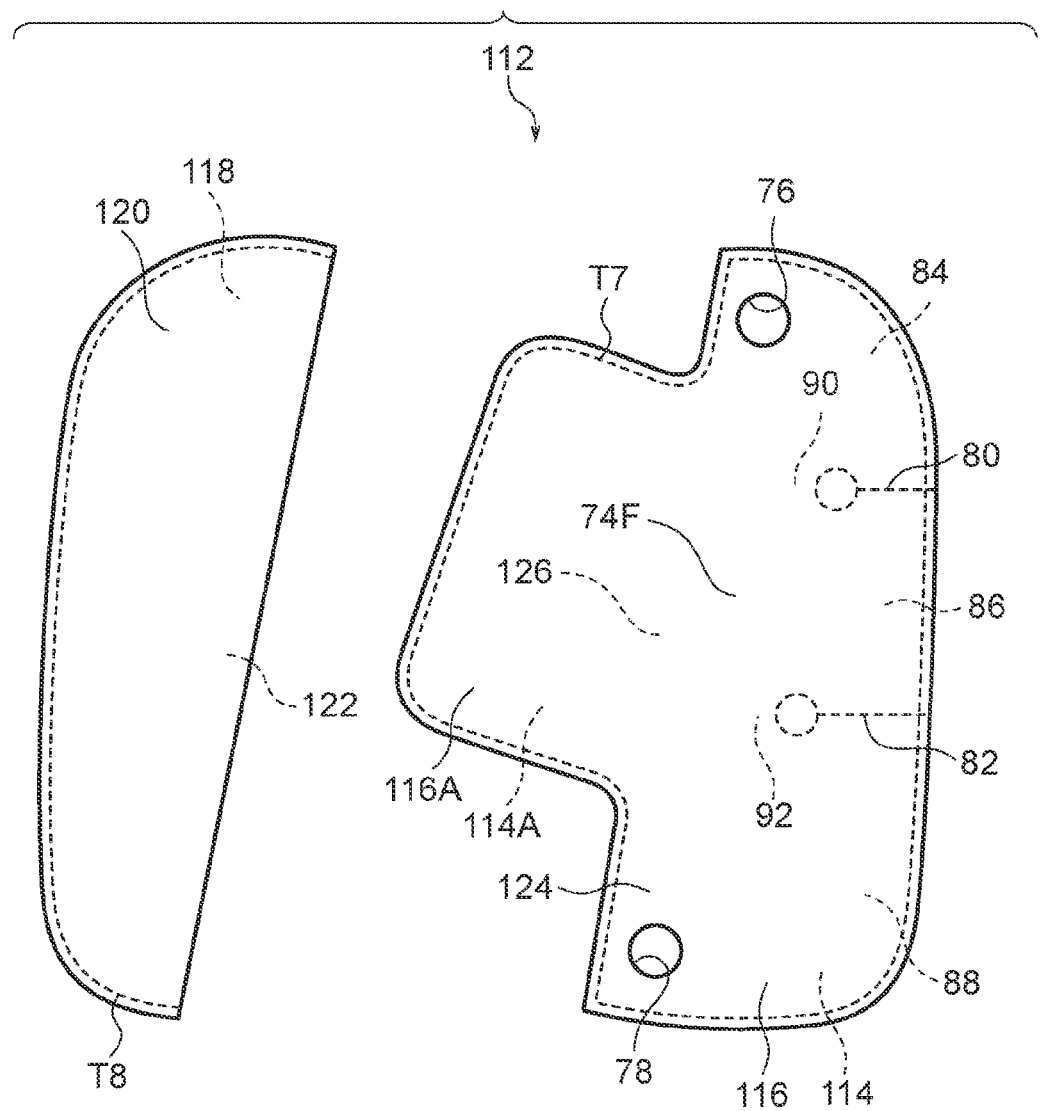
FIG. 13 is an plan view illustrating a rear bag section integrally formed together with an inner bag section, and a front bag section, opened out a state prior to joining the rear bag section and the front bag section together.

However, as illustrated in FIG. 13, in the side airbag 112, the inner bag section 64 is integrally formed to the rear bag section 74 by extension portions 114A, 116A where base cloths 114, 116 of the rear bag section 74 are extended from the front portion 74F of the rear bag section 74. As illustrated in FIG. 12, the inner bag section 64 extends (is folded) toward the side that will be on the seat width direction inner side of the rear bag section 74 in the inflated and deployed state. The front bag section 72 is formed from base cloths 118, 120 that are separate from the base cloths 114, 116 of the rear bag section 74. The front bag section 72 is joined to the front portion 74F of the rear bag section 74.

Specifically, the two base cloths 114, 116 configuring the rear bag section 74 are cut out in substantially T-shapes so as to include the extension portions 114A, 116A described above. The base cloths 114, 116 are mutually overlapped and stitched (joined) together at a stitching portion T7 (not illustrated in FIG. 11 and so on) at outer peripheral edge portions thereof, thereby forming the rear bag section 74 and the inner bag section 64 as an integral bag body.

The front bag section 72 is formed in an elongated bag shape by mutually overlapping and partially stitching (joining) together outer peripheral edge portions of the two base cloths 118, 120, cut out separately from the base cloths 114, 116 of the rear bag section 74, at a stitching portion T8 (see FIG. 12 and FIG. 13; reference numerals and/or illustration are omitted from the other drawings). The stitching portion T8 is absent from one long side edge portion (a rear edge portion) of the front bag section 72. An opening 122 is accordingly formed at a rear edge portion of the front bag section 72. The rear edge portion of the front bag section 72 is then stitched (joined) to the front portion 74F of the rear bag section 74 at a stitching portion T9 (see FIG. 12; reference numerals and/or illustration are omitted from the other drawings).

Specifically, of the base cloths 114, 116 of the rear bag section 74, the rear edge portion of the front bag section 72 is stitched to the base cloth 116 configuring a seat width direction outer portion of the rear bag section 74 and a seat width direction inner portion of the inner bag section 64 in the inflated and deployed state of the side airbag main body 62. A location of the base cloth 116 configuring the front portion 74F of the rear bag section 74 configures a tether portion (partitioning cloth portion) 124, and the inside of the front bag section 72 and the inside of the rear bag section 74 are partitioned from each other by the tether portion 124.

As illustrated in FIG. 11, FIG. 13, and so on, an upper side inner vent hole 76 is formed at an upper end portion of the tether portion 124, and the inside of the upper chamber 84 of the rear bag section 74 and the inside of the front bag section 72 are in communication with each other through the upper side inner vent hole 76. Moreover, a lower side inner vent hole 78 is formed at a lower end portion of the tether portion 124, and the inside of the lower chamber 88 of the rear bag section 74 and the inside of the front bag section 72 are in communication with each other through the lower side inner vent hole 78.

As illustrated in FIG. 12, the inner bag section 64 extends toward the side on the seat width direction inner side of the rear bag section 74 in the inflated and deployed state. The inside of the rear bag section 74 and the inside of the inner bag section 64 are in communication with each other at a communication path 126 positioned at the seat front of the front flange portion 30B of the outer side frame 30. The communication path 126 is positioned at a vertical direction intermediate portion of the side airbag main body 62, and is set with a larger dimension in the vertical direction than the vertical direction intermediate chamber 86 of the rear bag section 74. The vertical direction intermediate chamber 86 and the inside of the inner bag section 64 are in communication with each other directly, and not through inside the upper chamber 84 and inside the lower chamber 88. Other configuration is basically the same as that of the first exemplary embodiment.

Next, explanation follows regarding a manner in which gas flows inside the side airbag 112 when the inflator 52 has been actuated, with reference to FIG. 14A to FIG. 17B. Note that in FIG. 14A to FIG. 17B, in order to facilitate explanation, a state is illustrated in which the side airbag main body 62 has inflated and deployed and the inner bag section 64 has inflated, and regions of the side airbag 112 to which gas has been supplied are shaded with dots. FIG. 14A to FIG. 17B are schematic diagrams for explaining the manner in which gas flows inside the side airbag 112, and do not illustrate a sequence in which respective portions of the side airbag 112 are inflated. Reference numerals have been omitted from FIG. 14A to FIG. 17B as appropriate in order to facilitate viewing of the drawings.

Figure 14A:
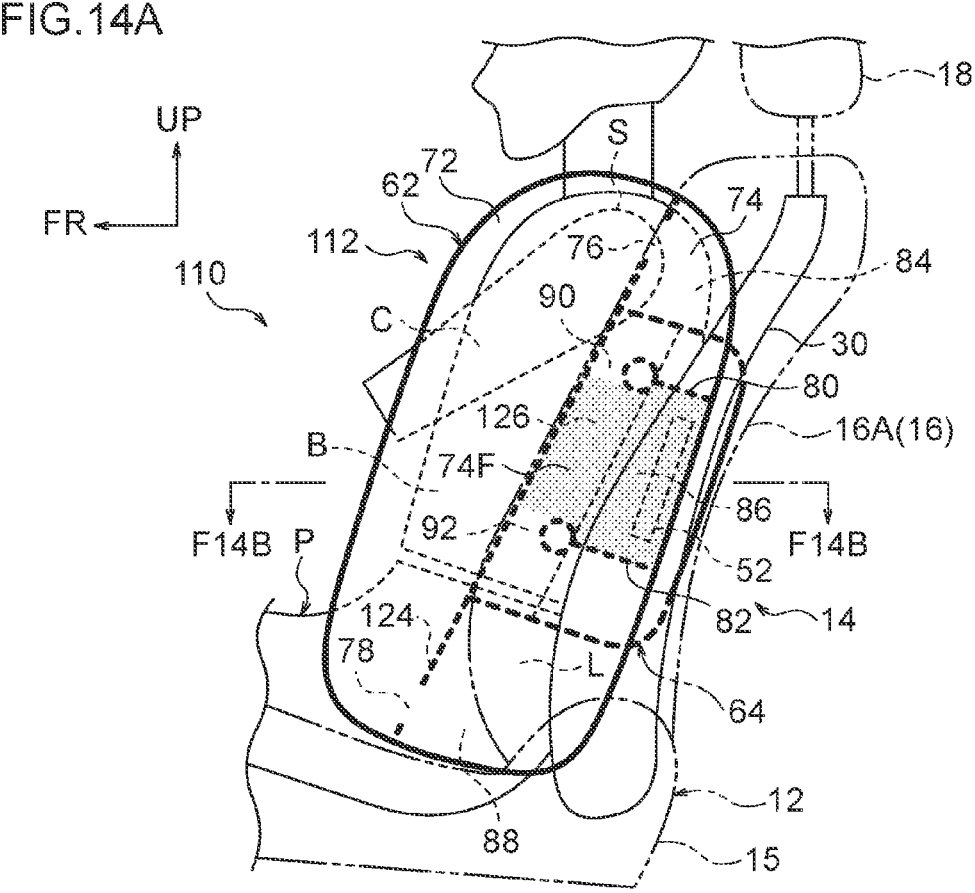
FIG. 14A is a side view corresponding to FIG. 11, schematically illustrating a state in which gas has been supplied into a vertical direction intermediate chamber of a rear bag section of a side airbag main body.
Figure 14B:
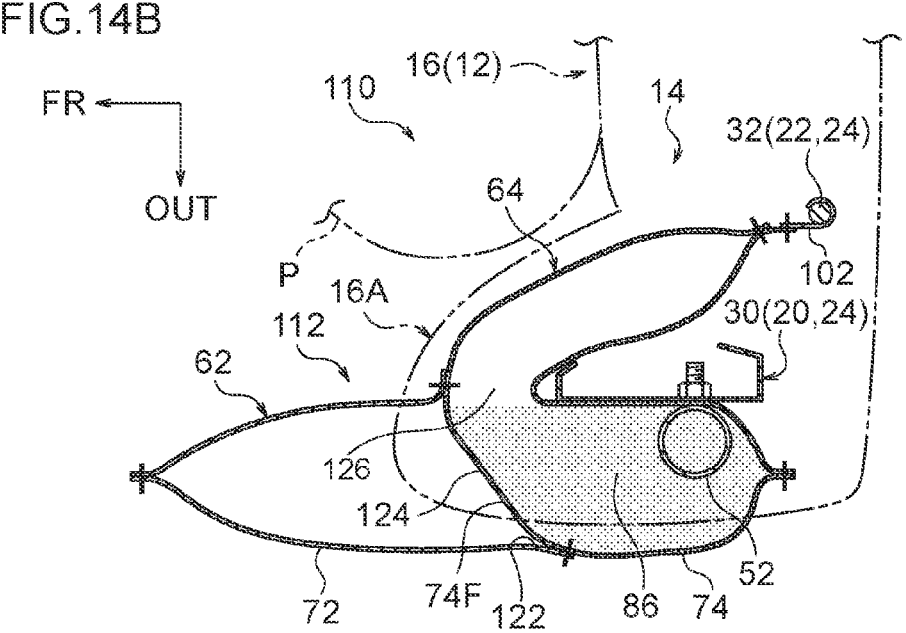
FIG. 14B is a cross-section illustrating relevant portions in close-up in a cross-section taken along line F14B-F14B in FIG. 14A.

In the side airbag 112 with the above configuration, the inflator 52 is housed inside the vertical direction intermediate chamber 86 of the rear bag section 74 of the side airbag main body 62. Thus, as illustrated in FIG. 14A and FIG. 14B, gas is first supplied into the vertical direction intermediate chamber 86 when the inflator 52 is actuated. The vertical direction intermediate chamber 86 inflates accordingly.

Figure 15A:
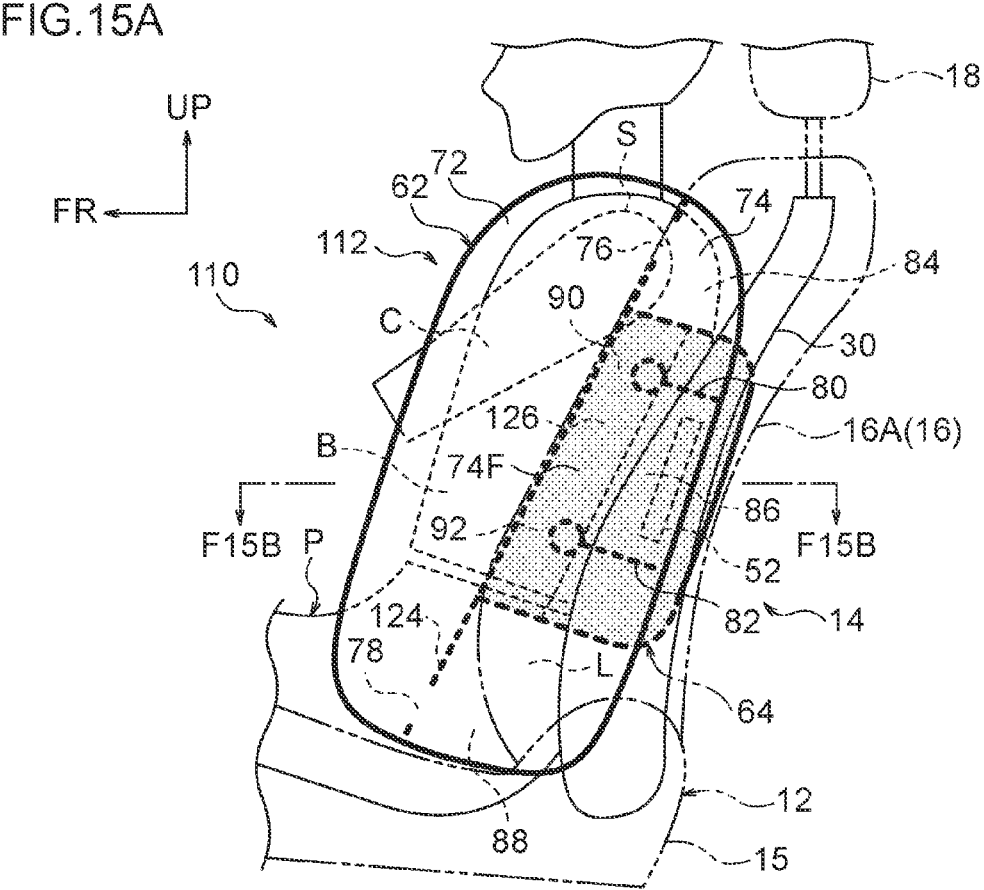
FIG. 15A is a side view corresponding to FIG. 11, schematically illustrating a state in which gas has been supplied into an inner bag section.
Figure 15B:
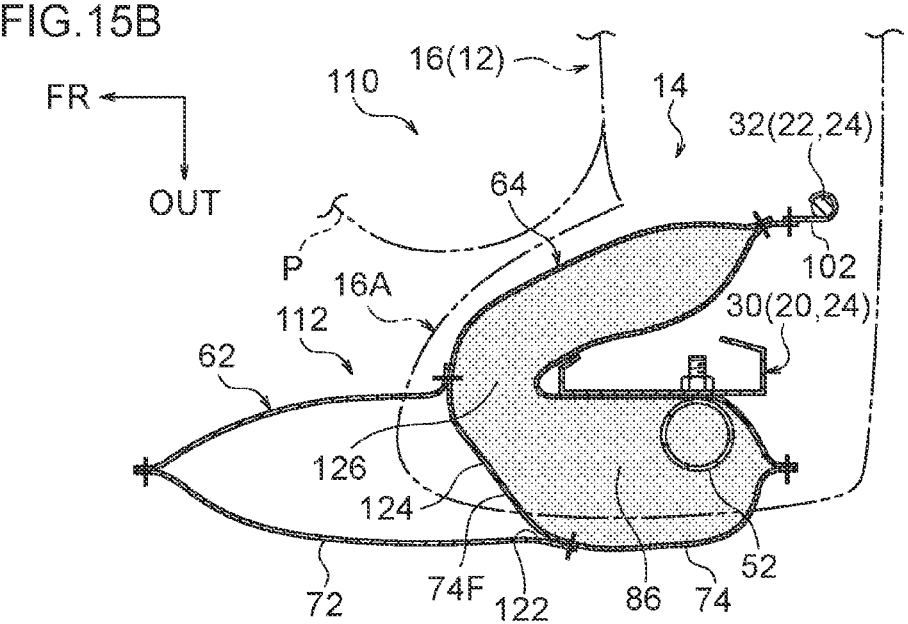
FIG. 15B is a cross-section illustrating relevant portions in close-up in a cross-section taken along line F15B-F15B in FIG. 15A.

Next, as illustrated in FIG. 15A and FIG. 15B, some of the gas that has been supplied into the vertical direction intermediate chamber 86 is supplied into the inner bag section 64 through the communication path 126. The inner bag section 64 inflates accordingly.

Figure 16A:
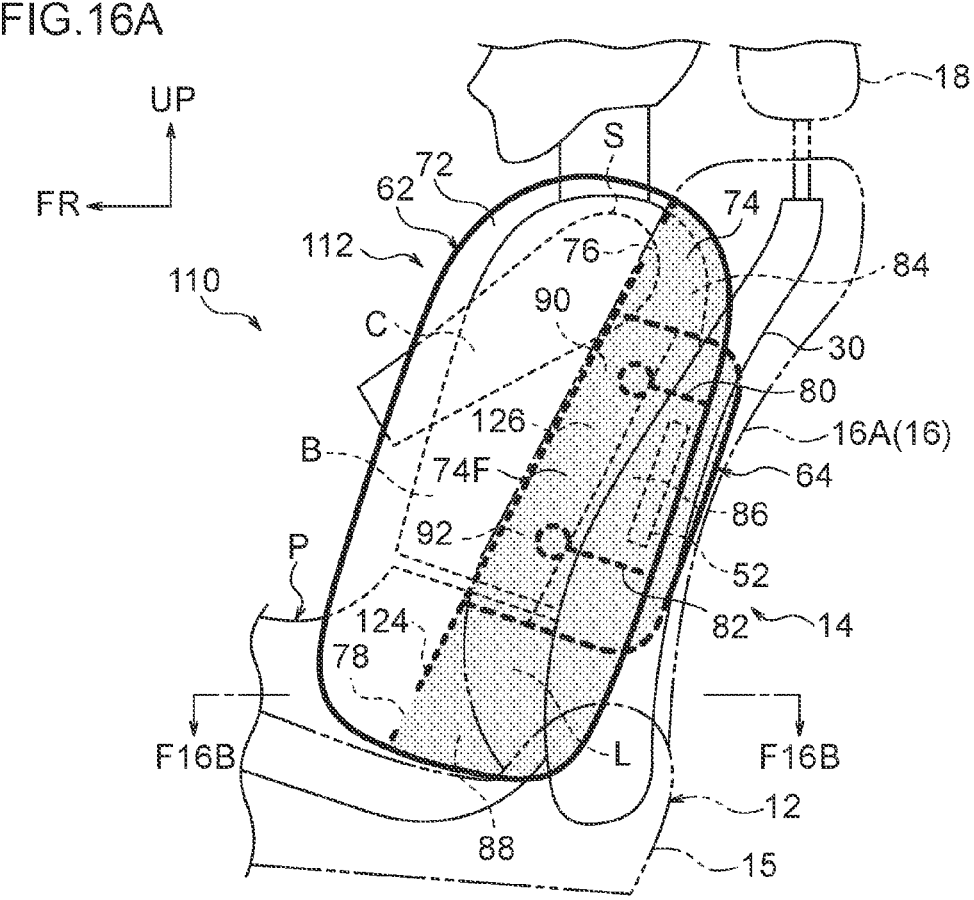
FIG. 16A is a side view corresponding to FIG. 11, schematically illustrating a state in which gas has been supplied into an upper chamber and into a lower chamber of a rear bag section of a side airbag main body.
Figure 16B:
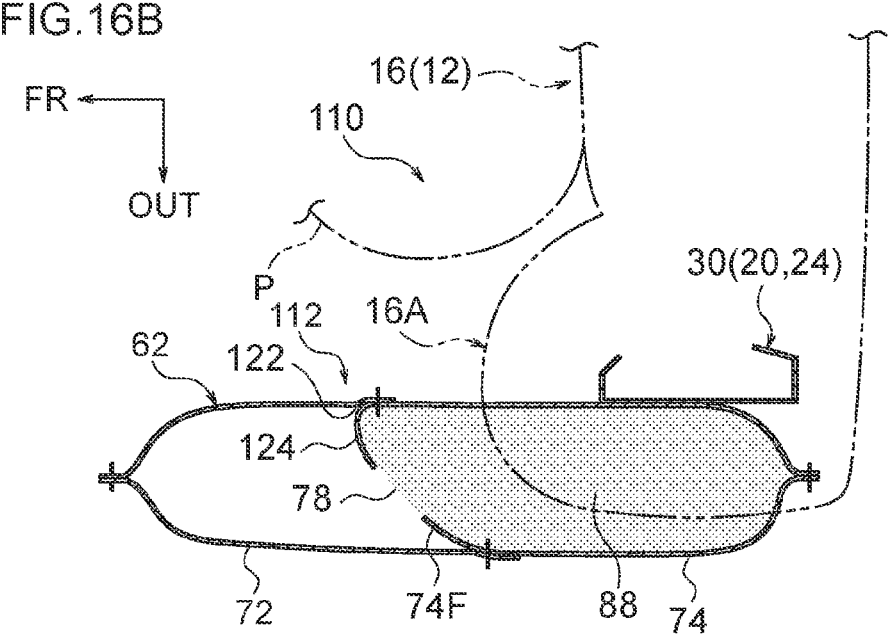
FIG. 16B is a cross-section illustrating relevant portions in close-up in a cross-section taken along line F16B-F16B in FIG. 16A.

Next, as illustrated in FIG. 16A and FIG. 16B, some of the gas that has been supplied into the vertical direction intermediate chamber 86 is supplied into the upper chamber 84 and the lower chamber 88 of the rear bag section 74 through the communication paths 90, 92. The upper chamber 84 and the lower chamber 88 inflate accordingly.

Figure 17A:
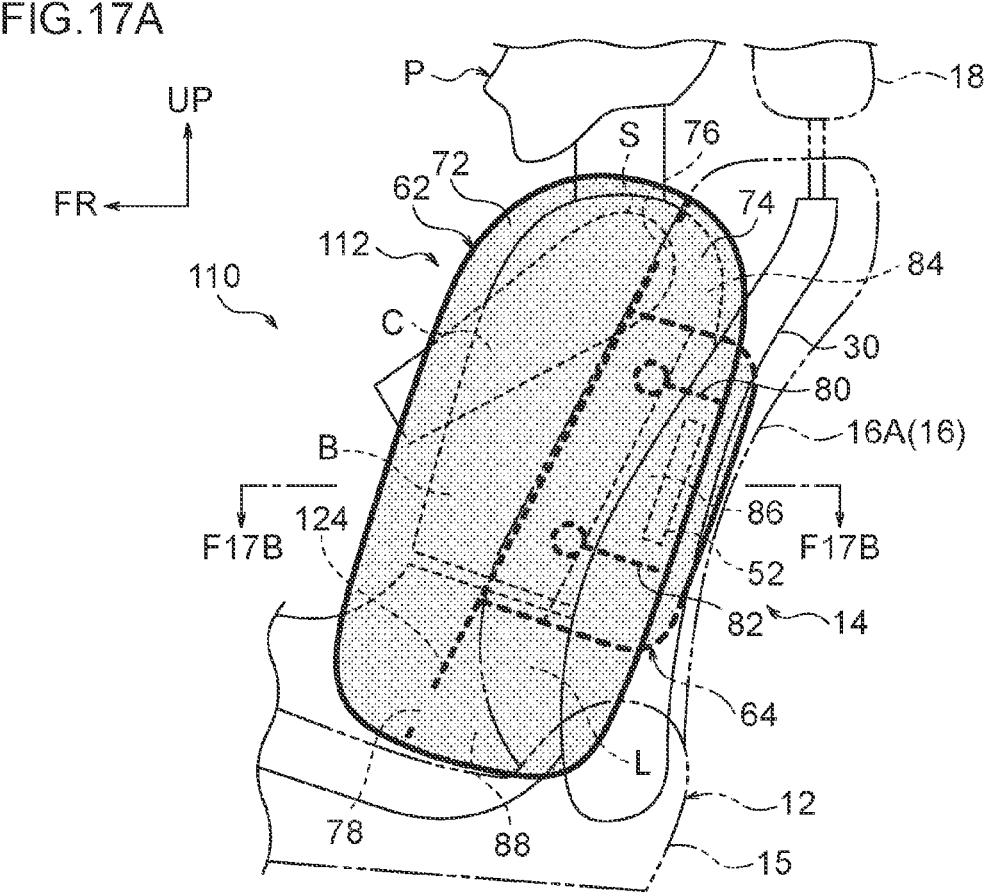
FIG. 17A is a side view corresponding to FIG. 11, schematically illustrating a state in which gas has been supplied into a front bag section of a side airbag main body.
Figure 17B:
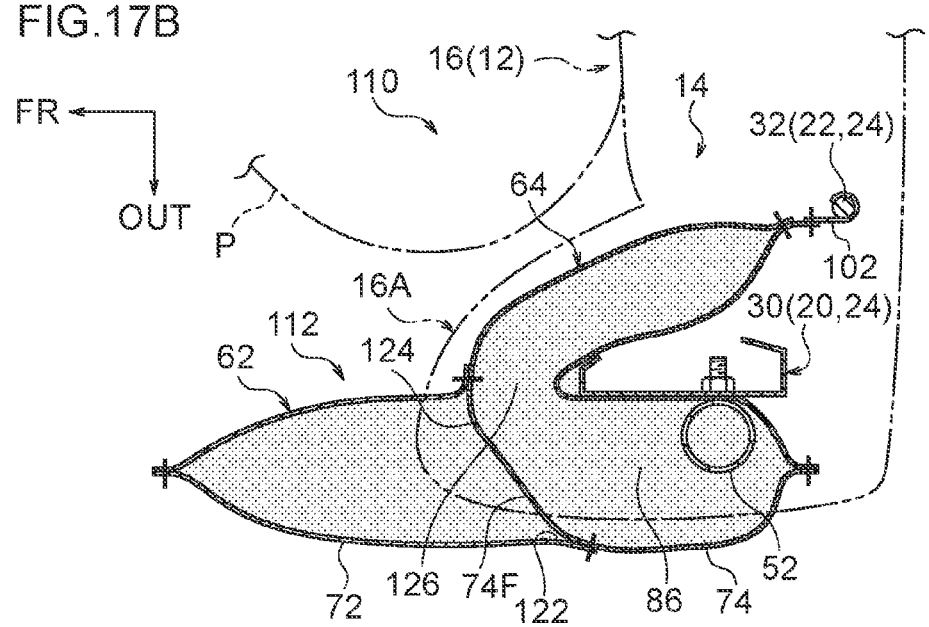
FIG. 17B is a cross-section illustrating relevant portions in close-up in a cross-section taken along line F17B-F17B in FIG. 17A.

Next, as illustrated in FIG. 17A and FIG. 17B, some of the gas that has been supplied into the upper chamber 84 and into the lower chamber 88 is supplied into the front bag section 72 through the upper side inner vent hole 76 and the lower side inner vent hole 78. The front bag section 72 inflates accordingly.

In the second exemplary embodiment, it is not possible to manufacture the side airbag 112 employing an existing front-rear dual chamber side airbag. However, the same basic operation and advantageous effects as those of the first exemplary embodiment can be obtained in other respects. In the second exemplary embodiment, the rear bag section 74 and the inner bag section 64 are configured as a single bag body. The second exemplary embodiment thereby enables gas inside the rear bag section 74 to be supplied into the inner bag section 64 more smoothly than in configurations in which the inside of the rear bag section 74 and the inside of the inner bag section 64 are in communication with each other through the communication port 94 formed in the base cloth 66 of the side airbag main body 62, as in the first exemplary embodiment. This thereby enables the inner bag section 64 to be inflated earlier than in the first exemplary embodiment.

Supplementary Explanation of Exemplary Embodiments

The second exemplary embodiment may be configured with a reaction force plate portion 30D (see FIG. 9) provided to the outer side frame 30.

In each of the exemplary embodiments described above, configuration is made in which the rear bag section 74 is partitioned into the upper chamber 84, the vertical direction intermediate chamber 86, and the lower chamber 88 by the upper and lower partitioning portions 80, 82. However, the present disclosure is not limited thereto, and configuration may be made in which the upper and lower partitioning portions 80, 82 are omitted.

In each of the exemplary embodiments described above, configuration is made in which inner vent holes are configured by the upper side inner vent hole 76 formed at the upper end portion of the tether 70 or the tether portion 124, and the lower side inner vent hole 78 formed at the lower end portion of the tether 70 or the tether portion 124. However, the present disclosure is not limited thereto. The number of, and positions for forming, the inner vent holes may be modified as appropriate.

In each of the exemplary embodiments described above, configuration is made in which the outer side frame 30 provided inside the side section 16A on the vehicle width direction outer side of the seatback 16 configures a "side frame" according to the present disclosure. However, there is no limitation thereto. The "side frame" according to the present disclosure may also be configured by the inner side frame provided inside the side section on the vehicle width direction inner side of the seatback 16.

Various other modifications may be implemented within a range not departing from the spirit of the present disclosure. Obviously, the scope of rights encompassed by the present disclosure is not limited to the exemplary embodiments described above.

What is claimed is:
1. A side airbag device-installed vehicle seat comprising:
a side frame that is provided inside a side section of a seatback, and that, as viewed along a height direction of the seatback, includes a side wall portion extending along a front-rear direction of the seatback and a front flange portion extending from a front end of the side wall portion toward a seat width direction inner side;
a side airbag main body that is partitioned into a front bag section and a rear bag section, internal portions of the front bag section and the rear bag section being in communication with each other through an inner vent hole, that is stowed in a folded state inside the side section at a seat width direction outer side of the side frame, that receives a supply of gas from an inflator housed inside the rear bag section and inflates and deploys toward a seat front side of the side section, and in which a front portion of the rear bag section is positioned further toward the seat front side than the front flange portion at least in an inflated and deployed state; and an inner bag section that extends out from the front portion of the rear bag section, past a seat front of the front flange portion, and to a seat width direction inner side of the side frame, and in which an internal portion of the inner bag section in communication with the inside of the front portion of the rear bag section is supplied with gas from the inflator and inflates within the side section.

2. The side airbag device-installed vehicle seat of claim 1, wherein:

the side airbag main body is formed with a communication port at a location configuring the front portion of the rear bag section and facing the seat width direction inner side in the inflated and deployed state;

the inner bag section is formed by a base cloth that is separate from a base cloth of the side airbag main body; and a peripheral edge portion of an opening formed in a base end portion of the inner bag section is joined to a peripheral edge portion of the communication port.

3. The side airbag device-installed vehicle seat of claim 1, wherein:

the inner bag section is integrally formed to the rear bag section by an extension portion where a base cloth of the rear bag section is extended from the front portion, and extends toward a side on the seat width direction inner side of the rear bag section in the inflated and deployed state; and the front bag section is formed by a base cloth that is separate from the base cloth of the rear bag section and is joined to the front portion of the rear bag section.

4. The side airbag device-installed vehicle seat of claim 1, wherein the side frame includes a reaction force plate portion that extends out obliquely from a seat width direction inner end portion of the front flange portion toward a seat rear side and the seat width direction inner side, and that faces the inner bag section from the seat width direction outer side.

5. The side airbag device-installed vehicle seat of claim 1, wherein:

the seatback includes a frame section configured including the side frame, and a seatback pad covering the frame section; and the folded side airbag main body and the inflator are attached to the side wall portion of the side frame, and a leading end portion of the inner bag section is coupled to the frame section.

6. The side airbag device-installed vehicle seat of claim 1, wherein:

the rear bag section is partitioned into an upper chamber, a vertical direction intermediate chamber, and a lower chamber that are in communication with each other at the front portion side;

the inflator is housed in the vertical direction intermediate chamber; and the inside of the vertical direction intermediate chamber and the inside of the inner bag section are in communication with each other directly, and not through the inside of the upper chamber and the inside of the lower chamber.

7. The side airbag device-installed vehicle seat of claim 6, wherein the inner vent hole is configured by:

an upper side inner vent hole that places the inside of the upper chamber and the inside of the front bag section in communication with each other; and a lower side inner vent hole that places the inside of the lower chamber and the inside of the front bag section in communication with each other.

8. The side airbag device-installed vehicle seat of claim 2, further comprising:

a check valve that is provided so as to be capable of opening and closing the communication port, that permits a flow of gas from inside the rear bag section to inside the inner bag section by opening the communication port, and restricts a flow of gas from inside the inner bag section to inside the rear bag section by closing off the communication port.

9. The side airbag device-installed vehicle seat of claim 1, wherein the inner bag section is stowed inside the side section in a state spread out in a flat shape, or in a state in which a leading end side of the inner bag section is folded in two.

* * * * *